(12) United States Patent
Tian et al.

(10) Patent No.: US 11,716,610 B2
(45) Date of Patent: Aug. 1, 2023

(54) WIDEBAND UPLINK CONTROL CHANNEL CAPABILITY INDICATION DURING INITIAL ACCESS

(71) Applicant: QUALCOMM Incorporated, San Diego, CA (US)

(72) Inventors: Qingjiang Tian, San Diego, CA (US); Xiaoxia Zhang, San Diego, CA (US); Jing Sun, San Diego, CA (US); Zhifei Fan, San Diego, CA (US); Wooseok Nam, San Diego, CA (US); Ahmed Abdelaziz Ibrahim Abdelaziz Zewail, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 17/301,804

(22) Filed: Apr. 14, 2021

(65) Prior Publication Data

US 2022/0337998 A1    Oct. 20, 2022

(51) Int. Cl.
*H04W 8/24* (2009.01)
*H04W 52/14* (2009.01)
(Continued)

(52) U.S. Cl.
CPC .......... *H04W 8/24* (2013.01); *H04W 52/146* (2013.01); *H04W 72/0453* (2013.01);
(Continued)

(58) Field of Classification Search
CPC .. H04L 5/0053; H04L 5/0048; H04W 52/146; H04W 72/048; H04W 52/367;
(Continued)

(56) References Cited

U.S. PATENT DOCUMENTS

2019/0230685 A1* 7/2019 Park ................. H04W 72/0446
2020/0359421 A1  11/2020 Yi et al.
(Continued)

FOREIGN PATENT DOCUMENTS

WO      2020/197292 A1    10/2020

OTHER PUBLICATIONS

Partial International Search Report and Provisional Written Opinion dated Jun. 24, 2022 from corresponding PCT Application No. PCT/US2022/071085.

(Continued)

Primary Examiner — Brian D Nguyen
(74) Attorney, Agent, or Firm — Arent Fox LLP/Qualcomm Incorporated

(57) ABSTRACT

Apparatus, methods, and computer-readable media for wideband uplink control channel capability indication during initial access are disclosed herein. A user equipment (UE) may transmit an uplink message indicating an uplink resource bandwidth capability of a physical uplink control channel (PUCCH) of the UE based on a power spectral density (PSD) limitation and a maximum transmission power of the UE. The UE may receive a downlink message indicating an uplink resource allocation of the PUCCH corresponding to the uplink resource bandwidth capability. Alternatively, the UE may receive a downlink configuration that indicates a first set of uplink resources and a second set of uplink resources. The UE may transmit an acknowledgment message in response to a downlink message of a random access channel process. The acknowledgment message includes the uplink resource bandwidth capability that indicates a selection between the first set of uplink resources and the second set of uplink resources.

60 Claims, 16 Drawing Sheets

(51) Int. Cl.
    *H04W 72/04*      (2023.01)
    *H04W 74/08*      (2009.01)
    *H04W 80/02*      (2009.01)
    *H04W 72/0453*    (2023.01)
    *H04W 72/21*      (2023.01)

(52) U.S. Cl.
    CPC ....... *H04W 72/21* (2023.01); *H04W 74/0833* (2013.01); *H04W 80/02* (2013.01)

(58) Field of Classification Search
    CPC ......... H04W 72/0413; H04W 74/0833; H04W 72/0453; H04W 80/02; H04W 8/24
    See application file for complete search history.

(56) References Cited

U.S. PATENT DOCUMENTS

| | | | |
|---|---|---|---|
| 2021/0136814 A1* | 5/2021 | You | H04B 7/0626 |
| 2021/0314938 A1* | 10/2021 | Kim | H04L 27/26025 |
| 2021/0329634 A1* | 10/2021 | Kim | H04L 27/26 |
| 2022/0007308 A1* | 1/2022 | Xiong | H04W 76/15 |
| 2022/0060999 A1* | 2/2022 | Oh | H04W 52/383 |
| 2022/0086824 A1* | 3/2022 | Kun | H04W 72/0413 |
| 2022/0166586 A1* | 5/2022 | Kun | H04L 5/0037 |
| 2022/0174609 A1 | 6/2022 | Kang et al. | |
| 2022/0190906 A1* | 6/2022 | Haghighat | H04W 74/0841 |
| 2022/0377720 A1* | 11/2022 | Park | H04W 52/281 |

OTHER PUBLICATIONS

International Search Report and Written Opinion—PCT/US2022/071085—ISA/EPO—dated Aug. 11, 2022.

* cited by examiner

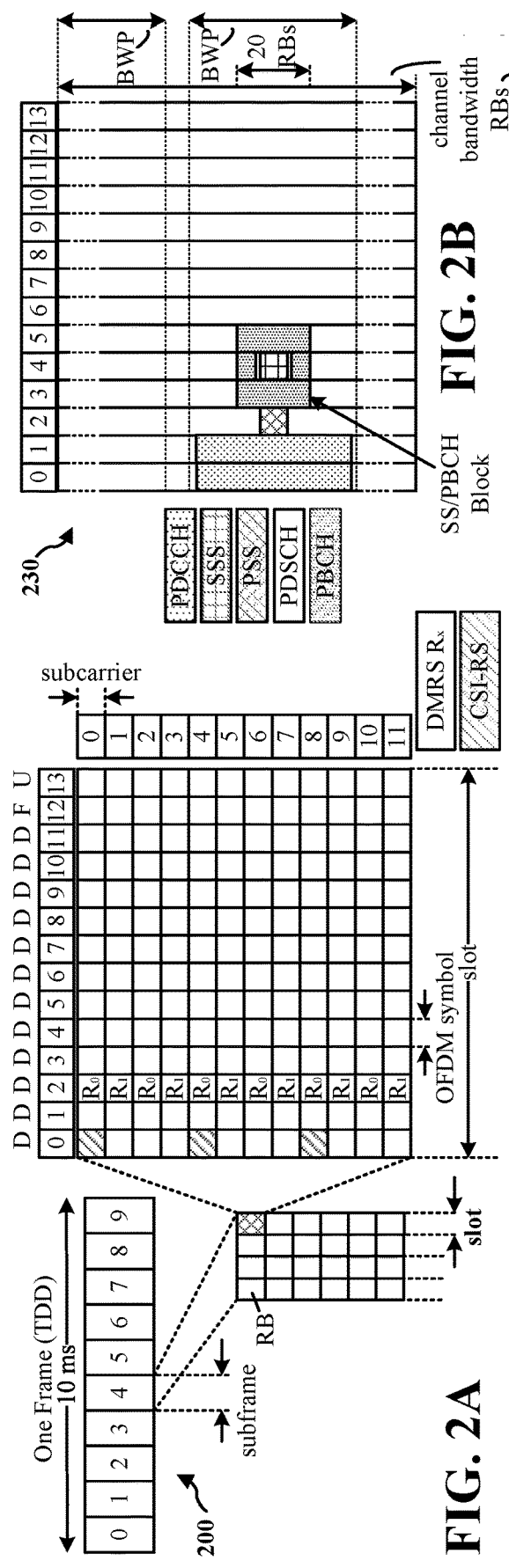
FIG. 2A
FIG. 2B
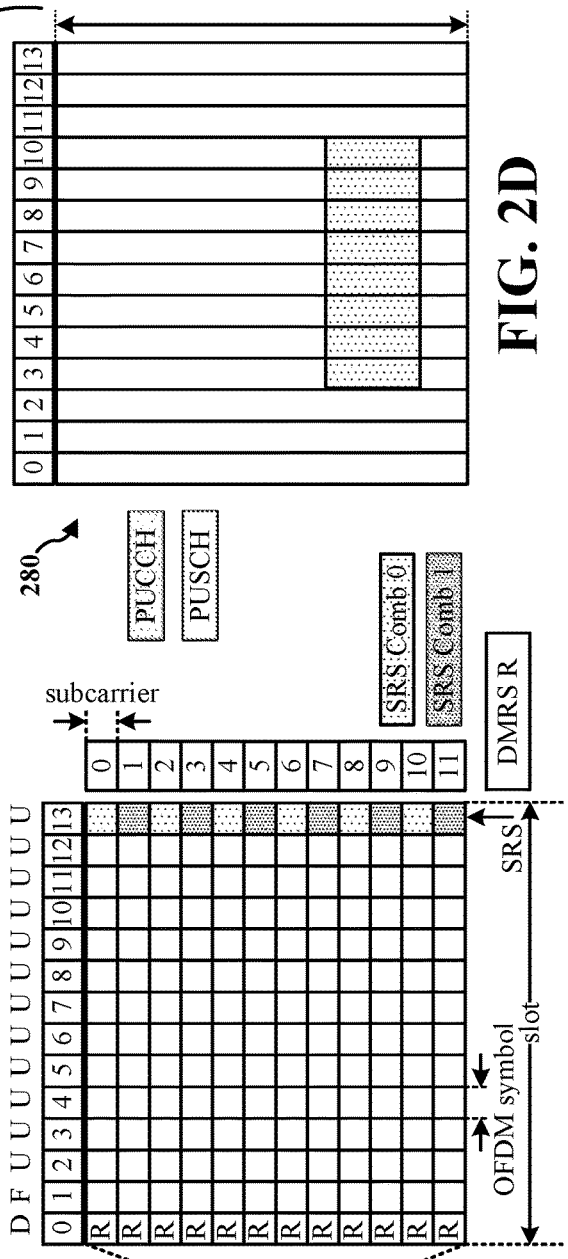
FIG. 2C
FIG. 2D

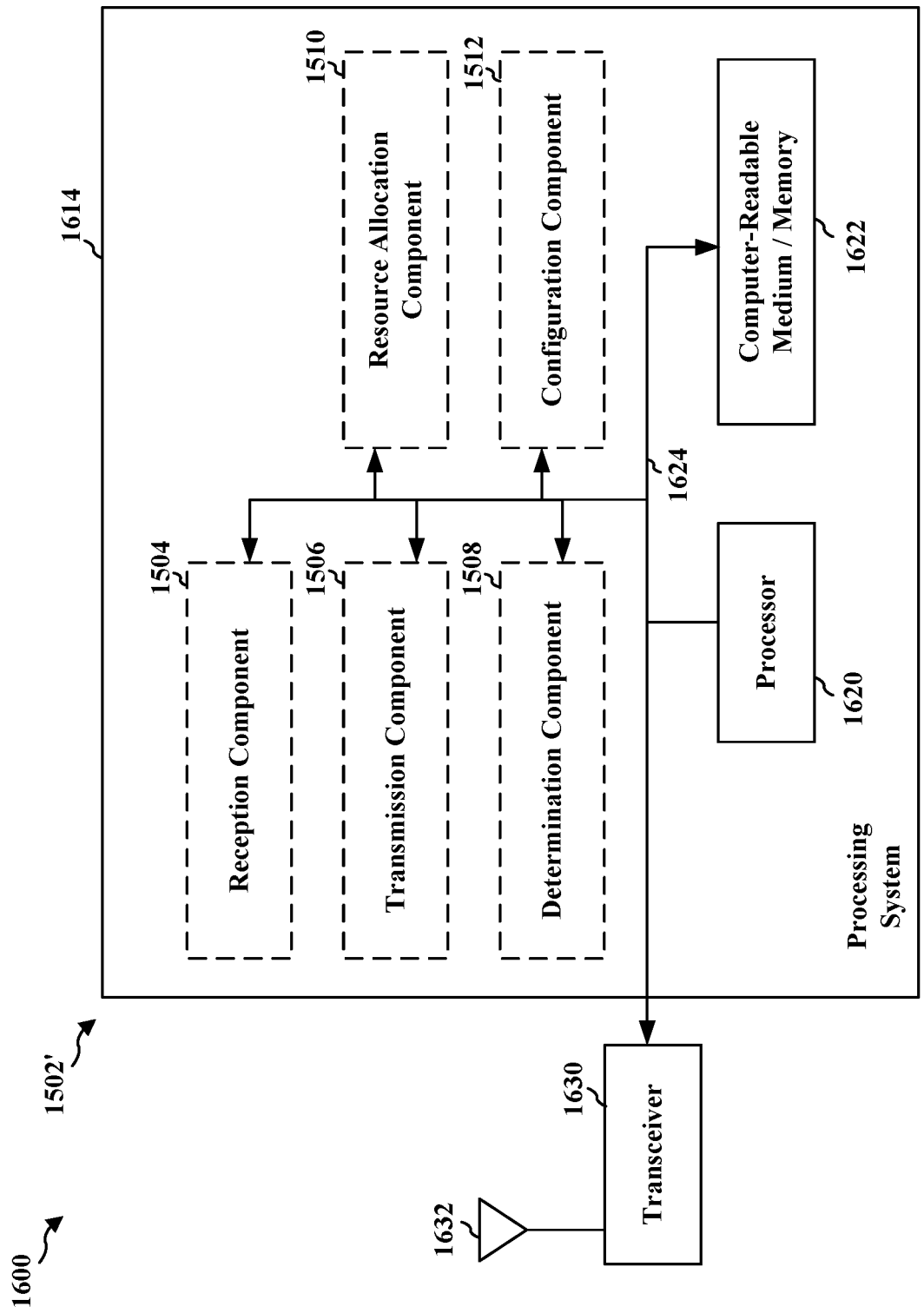

WIDEBAND UPLINK CONTROL CHANNEL CAPABILITY INDICATION DURING INITIAL ACCESS

BACKGROUND

Technical Field

The present disclosure relates generally to wireless communication, and more particularly, to techniques for wideband uplink control channel capability indication during initial access.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For NR in a 60 GHz frequency band, the European Telecommunications Standard Institute (ETSI) regulation allows 23 decibel-milliwatts per megahertz (dBm/MHz) power spectral density (PSD) limitation and 40 dBm Effective Isotropic Radiated Power (EIRP) for c1 and c2 cases. For NR operation in a frequency range between 52 GHz and 71 GHz, the subcarrier spacing (SCS) may be set to 120 KHz as the numerology. Under a SCS of 120 KHz, a single resource block (RB) is 1.44 MHz, which may translate to about 24.58 dBm in transmit power under the PSD limitation. For a normal user equipment (UE), the maximum EIRP is limited. In some aspects, the maximum EIRP the UE may support is 23 dBm. In this regard, a single RB transmission may already consume all allowable transmit power of the UE (e.g., 24.58 dBm). However, for a customer premises equipment (CPE) device, the maximum EIRP can be larger. In this case, if the allocated bandwidth is narrow, such as a single RB, the UE transmit power may be limited by PSD and may not transmit at a higher power, although the UE (e.g., as a CPE device) is capable of transmitting with more power (e.g., EIRP).

The subject technology provides for a scheme to indicate a resource set between a single RB and multiple RBs that is supported by a UE to improve physical uplink control channel (PUCCH) bandwidth capacity during initial access. For example, the subject technology provides for a UE to indicate its capability to the network by indicating whether it can support either a multi-RB PUCCH or a single RB PUCCH via random access channel (RACH) messages. In some aspects, the UE can indicate its wideband capability via RACH message 3 signaling in a four-step RACH process (or RACH message A signaling in a two-step RACH process). In some aspects, the base station can configure two sets of default PUCCH resources. For example, the base station may configure separate sets of uplink resources containing different PUCCH resources (e.g., single RB PUCCH, multi-RB PUCCH), and the base station may configure a switching point in terms of transmission power for a UE to select between the single RB PUCCH and the multi-RB PUCCH. A Legacy low-power UE may not need to understand the separate uplink resource configuration or the multi-RB PUCCH allocation. A CPE UE may integrate its PRACH selection in the power ramping process. For example, when the CPE UE determines that its intended transmit power for the acknowledgment message to the RACH message 4 is lower than a transmit power threshold, the CPE UE may indicate that it has the capability to support the single RB PUCCH. Alternatively, when the CPE UE determines that its intended transmit power for the acknowledgment message to the RACH message 4 exceeds the transmit power threshold, the CPE UE may indicate that it has the capability to support the multi-RB PUCCH. Depending in which uplink resource set the RACH message 4 acknowledgment is detected, the base station can determine which set of PUCCH resources the UE may use for the base station to monitor for any subsequent PUCCH.

In an aspect of the disclosure, a method, a computer-readable medium, and an apparatus are provided. The apparatus may be a UE. The apparatus is configured to transmit, to a base station (BS) over an uplink channel, an uplink message indicating an uplink resource bandwidth capability of a physical uplink control channel of the UE based at least in part on a power spectral density limitation and a maximum transmission power of the UE. The apparatus is also configured to receive, from the BS over a downlink channel, a downlink message indicating an uplink resource allocation of the PUCCH that corresponds to the uplink resource bandwidth capability.

In an aspect of the disclosure, a method, a computer-readable medium, and an apparatus are provided. The apparatus may be a UE. The apparatus is configured to receive, from a base station (BS) over a downlink channel, a radio resource control (RRC) message comprising a downlink configuration that indicates a first set of uplink resources and a second set of uplink resources. The apparatus is also configured to transmit, to the BS over an uplink channel, an acknowledgment message in response to a downlink message of a random access channel process, the acknowledgment message indicating an uplink resource bandwidth capability of a physical uplink control channel of the UE and further indicating a selection between the first set of uplink resources and the second set of uplink resources based on a power spectral density limitation and a maximum transmission power of the UE.

In an aspect of the disclosure, a method, a computer-readable medium, and an apparatus are provided. The apparatus may be a base station. The apparatus is configured to receiving, from a user equipment over an uplink channel, an uplink message indicating an uplink resource bandwidth capability of a physical uplink control channel of the UE based on a power spectral density limitation and a maximum transmission power of the UE. The apparatus is also configured to transmit, to the UE over a downlink channel, a downlink message indicating an uplink resource allocation of the PUCCH that corresponds to the uplink resource bandwidth capability.

In an aspect of the disclosure, a method, a computer-readable medium, and an apparatus are provided. The apparatus may be a base station. The apparatus is configured to transmit, to a user equipment over a downlink channel, a radio resource control message comprising a downlink configuration that indicates a first set of uplink resources and a second set of uplink resources. The apparatus is also configured to receive, from the UE over an uplink channel, an acknowledgment message in response to a downlink message of a random access channel process, the acknowledgment message indicating an uplink resource bandwidth capability of a physical uplink control channel of the UE and further indicating a selection between the first set of uplink resources and the second set of uplink resources based on a power spectral density limitation and a maximum transmission power of the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 16 is a diagram illustrating an example of a hardware implementation for an apparatus employing a processing system.

DETAILED DESCRIPTION

Figure 1:
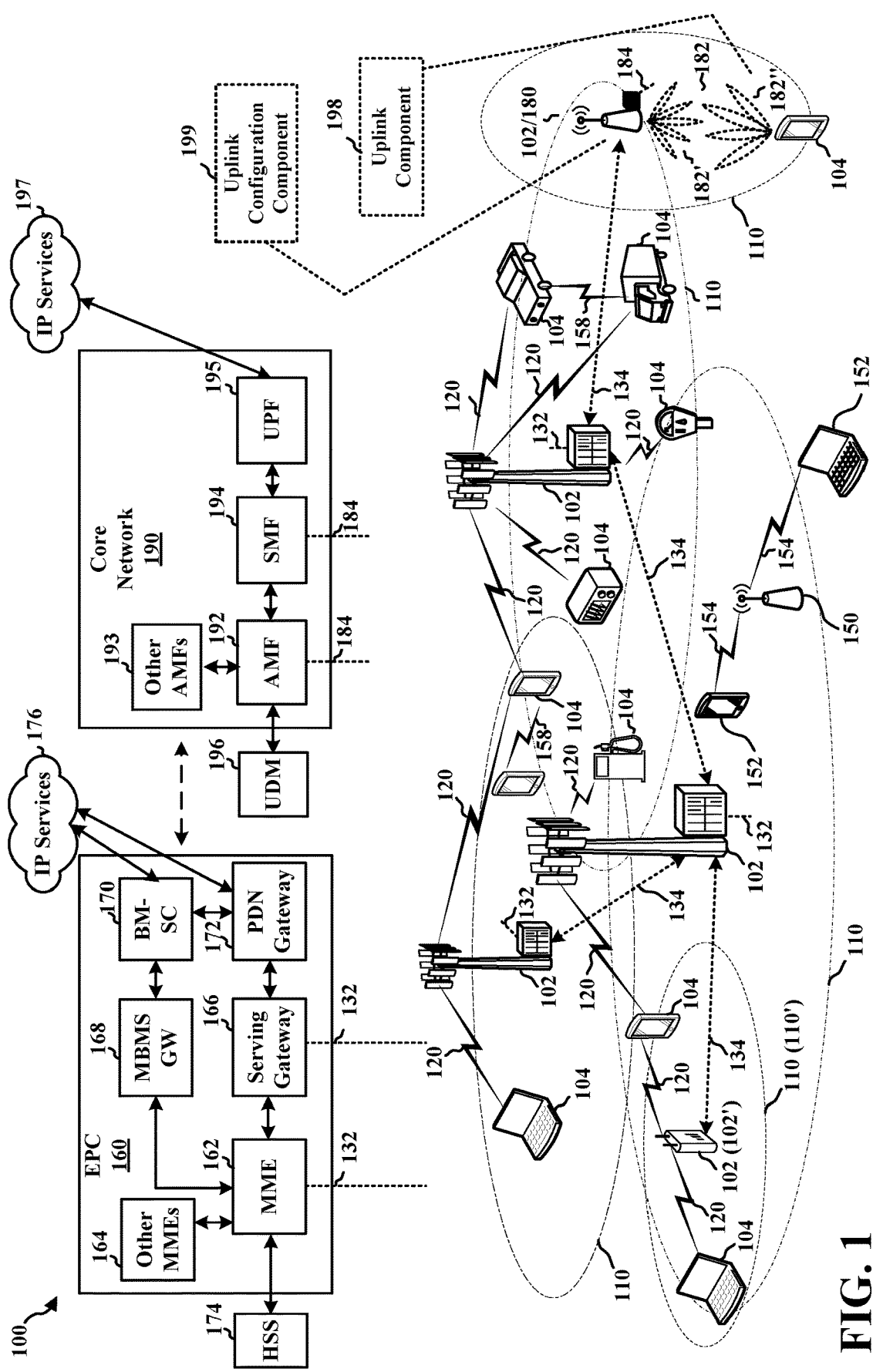
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE). In a wireless network, a base station (BS) may serve one or more UEs. Each UE may transmit uplink (UL) control information to a serving BS to facilitate scheduling at the BS. UL refers to the transmission direction from a UE to a BS. UL control channel information may include scheduling requests (SRs), channel status information, and message acknowledgements. Channel status information may include channel quality information (CQI), channel state information (CSI), pre-coding matrix indicators (PMIs), and/or rank indicators (RIs). Message acknowledgements may include hybrid automatic repeat request (HARD) acknowledgements/not-acknowledgments (ACKs/NAKs).

To meet the growing demands for expanded mobile broadband connectivity, wireless communication technologies are advancing from the Long-Term Evolution (LTE) technology to a next generation new radio (NR) technology. NR may provision for dynamic medium sharing among network operators in a licensed spectrum, a shared spectrum, and/or an unlicensed spectrum. For example, shared spectrums and/or unlicensed spectrums may include frequency bands at about 3.5 gigahertz (GHz), about 6 GHz, and about 60 GHz.

In the context of NR, UL control information may be carried in a physical uplink control channel (PUCCH). NR may define various PUCCH formats for carrying UL control information of different types and/or different sizes and may support multiplexing for some PUCCH formats. For example, NR may include a PUCCH format 0 and a PUCCH format 1, among others. In some instances, a PUCCH signal may carry uplink control information (UCI) and a demodulation reference signal (DMRS), which may facilitate channel estimation and UCI decoding at the BS.

In NR, a short PUCCH format 0 may span a duration of about one orthogonal frequency-division multiple (OFDM) symbol or about two OFDM symbols and may carry two or less uplink control information (UCI) bits. A long PUCCH format 1 may have a duration between about four OFDM symbols and about fourteen OFDM symbols and may carry two or less UCI bits. NR may support multiplexing of different UEs on the same frequency resources for some of the PUCCH formats (e.g., formats 0 and 1).

Some spectrums may have certain PSD limitations. For example, the ETSI document EN 301 893 V2.1.1 specifies various PSD limits for sub-6 GHz frequency bands and the ETSI draft document EN 302 567 V2.0.22 specifies a maximum equivalent isotropic radiated power (EIRP) and an EIRP density for 60 GHz frequency bands. Some other frequency bands, such as citizens broadband radio service (CBRS) bands at about 3.5 GHz, may not restrict transmissions to a particular PSD limit. In general, different spectrums may have different PSD limitations and/or different bandwidth occupancy requirements.

In the 60 GHz frequency band, the ETSI regulation allows 23 dBm/MHz PSD limitation and 40 dBm EIRP for c1 and c2 cases. For NR operation in a frequency range between 52 GHz and 71 GHz, the subcarrier spacing (SCS) may be set to 120 KHz as the numerology. Under a SCS of 120 KHz, a single resource block (RB) is 1.44 MHz, which may translate to about 24.58 dBm in transmit power. For a normal UE, the maximum EIRP is limited. In some aspects, the maximum EIRP the UE may support is 23 dBm. In this regard, a single RB transmission may already consume all allowable transmit power of the UE (e.g., 24.58 dBm). However, for a customer premises equipment (CPE) device, the maximum EIRP can be larger. In this case, if the allocated bandwidth is narrow, such as a single RB, the UE transmit power may be limited by PSD and may not transmit at a higher power, although the UE (e.g., as a CPE device) is capable of transmitting with more power (e.g., EIRP).

As described above, some frequency spectrums may have certain PSD limitations. To meet the PSD limitation, a UE may only be able to transmit up to a certain maximum power depending on the signal bandwidth. One approach to meeting the PSD limitation of a frequency spectrum and allowing a wireless communication device to transmit in the frequency spectrum at a full transmit power is to spread the frequency occupancy of a transmission signal over a wider bandwidth. However, the spreading of the frequency occupancy reduces the number of wireless communication devices that can be frequency-multiplexed in the frequency spectrum.

The present application describes mechanisms for scheduling uplink control channel signals from multiple UEs in a shared spectrum including a PSD limitation. For a connected mode UE, the UE capability may be known to a base station (e.g., gNB) through RRC. In this respect, the base station can schedule the UE with a wider uplink bandwidth and lower modulation and coding scheme (MCS) to collect more power. However, this scheme may not be available during initial access for PUCCH formats 0/1, which may occupy a single RB. In NR-U, to solve the link budget issue for PUCCH formats 0/1, one approach includes an interlaced version of the PUCCH formats 0/1, where one interlace with a bandwidth of 20 MHz (e.g., 10 or 11 RBs) is used for one PUCCH format 0/1 transmission. In an alternative approach, the NR-U design for interlaced PUCCH transmissions may be extended for millimeter-wavelength (mmW) band with PSD limitation, such that multiple continuous RBs are used for transmitting a PUCCH signal instead of using interlaced RB allocations. However, for initial network access, the base station may find it challenging to determine the proper PUCCH format (e.g., from a default PUCCH table) a UE may use when both low power UEs (e.g., not capable of high transmit power) and CPE UEs (e.g., capable of high transmit power) are present. In some aspects, low-power UEs may not use a wideband PUCCH format (e.g., 10 or 11 RBs), whereas a CPE UE may not need to use a wideband PUCCH format if the CPE UE is in the cell center.

The subject technology provides for a scheme to indicate a resource set between a single RB and multiple RBs that is supported by a UE to improve physical uplink control channel (PUCCH) bandwidth capacity during initial access. For example, the subject technology provides for a UE to indicate its capability to the network by indicating whether it can support either a multi-RB PUCCH or a single RB PUCCH via random access channel (RACH) messages. In some aspects, the UE can indicate its wideband capability via RACH message 3 signaling in a four-step RACH process (or RACH message A signaling in a two-step RACH process). In some aspects, the base station can configure two sets of default PUCCH resources. For example, the base station may configure separate sets of uplink resources containing different PUCCH resources (e.g., single RB PUCCH, multi-RB PUCCH), and the base station may configure a switching point in terms of transmission power for a UE to select between the single RB PUCCH and the multi-RB PUCCH. A Legacy low-power UE may not need to understand the separate uplink resource configuration or the multi-RB PUCCH allocation. A CPE UE may integrate its PRACH selection in the power ramping process. For example, when the CPE UE determines that its intended transmit power for the acknowledgment message to the RACH message 4 is lower than a transmit power threshold, the CPE UE may indicate that it has the capability to support the single RB PUCCH. Alternatively, when the CPE UE determines that its intended transmit power for the acknowledgment message to the RACH message 4 exceeds the transmit power threshold, the CPE UE may indicate that it has the capability to support the multi-RB PUCCH. Depending in which uplink resource set the RACH message 4 acknowledgment is detected, the base station can determine which set of PUCCH resources the UE may use for the base station to monitor for any subsequent PUCCH.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In various aspects, the access network 100 may operate over various frequency bands, for example, in frequency ranges between about 2 GHz to above 60 GHz. Different frequency bands may have different PSD requirements. As described above, the ETSI document EN 301 893 V2.1.1 specifies PSD requirements for various sub-6 GHz bands. For example, the frequency band between about 5150 MHz and about 5350 MHz may have a maximum allowable PSD level of about 10 dBm/MHz with transmit power control (TPC). The frequency band between about 5250 MHz and about 5350 MHz may have a maximum allowable PSD level of about 7 dBm/MHz without TPC. The frequency band between about 5150 MHz and about 5250 MHz may have a maximum allowable PSD level of about 10 dBm/MHz without TPC. The frequency band between about 5470 MHz and about 5725 MHz may have a maximum allowable PSD level of about 17 dBm/MHz with TPC and a maximum allowable PSD level of about 14 dBm/MHz without TPC. The ETSI draft document EN 302 567 V2.0.22 specifies a maximum EIRP and an EIRP density for 60 GHz bands. For example, a 60 GHz band may allow an EIRP density of about 13 dBm/MHz and an EIRP of about 40 dBm. In the 60 GHz frequency band, the ETSI regulation allows 23 dBm/MHz PSD limitation.

To satisfy a certain PSD limitation in a frequency spectrum, a transmitter (e.g., the BSs 102 and the UEs 104) may distribute the frequency occupancy of a transmission signal over a wider bandwidth. For example, a transmitter may transmit a signal over multiple narrow contiguous frequencies in a frequency bandwidth. The distribution of the frequency occupancy may be in various granularities and forms, such as a single resource block or multiple resource blocks, as described in greater detail herein. In one or more implementations, the BSs 102 (and/or 180) and the UEs 104 may communicate over the various frequency bands by selecting between a single resource block waveform and a multi-resource block waveform depending on the PSD requirements in the frequency spectrums and/or the power utilization factors of the UEs 104. Mechanisms for selecting between the single resource block waveform and the multi-resource block waveform are described in greater detail herein.

Referring again to FIG. 1, in certain aspects, the UE 104 may include an uplink component 198 that is configured to transmit, to a base station over an uplink channel, an uplink message indicating an uplink resource bandwidth capability of a PUCCH of the UE based on a power spectral density limitation and a maximum transmission power of the UE. The uplink component 198 is also configured to receive, from the BS over a downlink channel, a downlink message indicating an uplink resource allocation of the PUCCH that corresponds to the uplink resource bandwidth capability. The uplink component 198 is also configured to receive, from a base station over a downlink channel, a radio resource control message comprising a downlink configuration that indicates a first set of uplink resources and a second set of uplink resources. The uplink component 198 is also configured to transmit, to the BS over an uplink channel, an acknowledgment message in response to a downlink message of a random access channel process, in which the acknowledgment message indicates an uplink resource bandwidth capability of the PUCCH of the UE and further indicates a selection between the first set of uplink resources and the second set of uplink resources based on a power spectral density limitation and a maximum transmission power of the UE.

Referring still to FIG. 1, in certain aspects, the base station 102/180 may include an uplink configuration component 199 that is configured to receive, from a user equipment over an uplink channel, an uplink message indicating an uplink resource bandwidth capability of a PUCCH of the UE based on a power spectral density limitation and a maximum transmission power of the UE. The uplink configuration component 199 is also configured to transmit, to the UE over a downlink channel, a downlink message indicating an uplink resource allocation of the PUCCH that corresponds to the uplink resource bandwidth capability. The uplink configuration component 199 is also configured to transmit, to a user equipment over a downlink channel, a RRC message that includes a downlink configuration that indicates a first set of uplink resources and a second set of uplink resources of a PUCCH. The uplink configuration component 199 is also configured to receive, from the UE over an uplink channel, an acknowledgment message in response to a downlink message of a random access channel process, in which the acknowledgment message indicates an uplink resource bandwidth capability of the PUCCH of the UE and further indicates a selection between the first set of uplink resources and the second set of uplink resources based on a power spectral density limitation and a maximum transmission power of the UE.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

In uplink repetitions, two PUCCH sequences may overlap with one another over at least one slot (e.g., in a slot-based procedure). A UE may be configured to transmit PUCCH in a set of symbols, and the UE may detect a dynamic grant (e.g., DCI 2_0) indicating a subset of the set of symbols as a downlink data transmission or other flexible downlink signaling. In other examples, the UE may detect other types of DCI (e.g., DCI 1_0/1_1/0_1) indicating CSI-RS or PDSCH in a subset of the set of symbols. In some approaches of facilitating uplink repetitions, after some processing time (e.g., about two symbols from end of DCI) to decode the DCI associated with the PDSCH, for example, the UE may cancel (or drop) the PUCCH from the subset of symbols. In some examples, in the case of a PUCCH repetition, the UE may only cancel the PUCCH repetition overlapped with a DG PDSCH. In some aspects, the UE may avoid SPS HARQ-ACK dropping for TDD due to a potential PUCCH collision with at least one downlink symbol or flexible symbol. In some aspects, a dropped SPS ACK/NACK signal due to a dynamic SFI or dynamic grant (DG), a semi-static TDD can be retransmitted by the UE. As described above, when an SPS-based uplink repetition carrying HARQ-ACK information overlaps with a DG PDSCH, the uplink repetition is dropped. However, this approach in handling overlapped uplink repetitions with SPS HARQ-ACK information requires additional resources to retransmit downlink data when a dropped uplink repetition carries SPS HARQ-ACK information.

The subject technology provides for selecting between a single RB and multiple RBs with a corresponding cyclic shift step size to improve PUCCH multiplexing capacity when using contiguous frequencies. For example, the subject technology provides for having different PRACH resources for UEs requesting either a multi-RB PUCCH or a single RB PUCCH. In this regard, the subject technology increases UE frequency multiplexing capacity for PUCCH formats 0/1 by supporting use of single or multi-RB resource allocations. The use of frequency multiplexing with cyclic-shift separation that corresponds to a nominal multi-RB PUCCH size for PUCCH formats 0/1 can further increase UE frequency multiplexing capacity.

Figure 3:
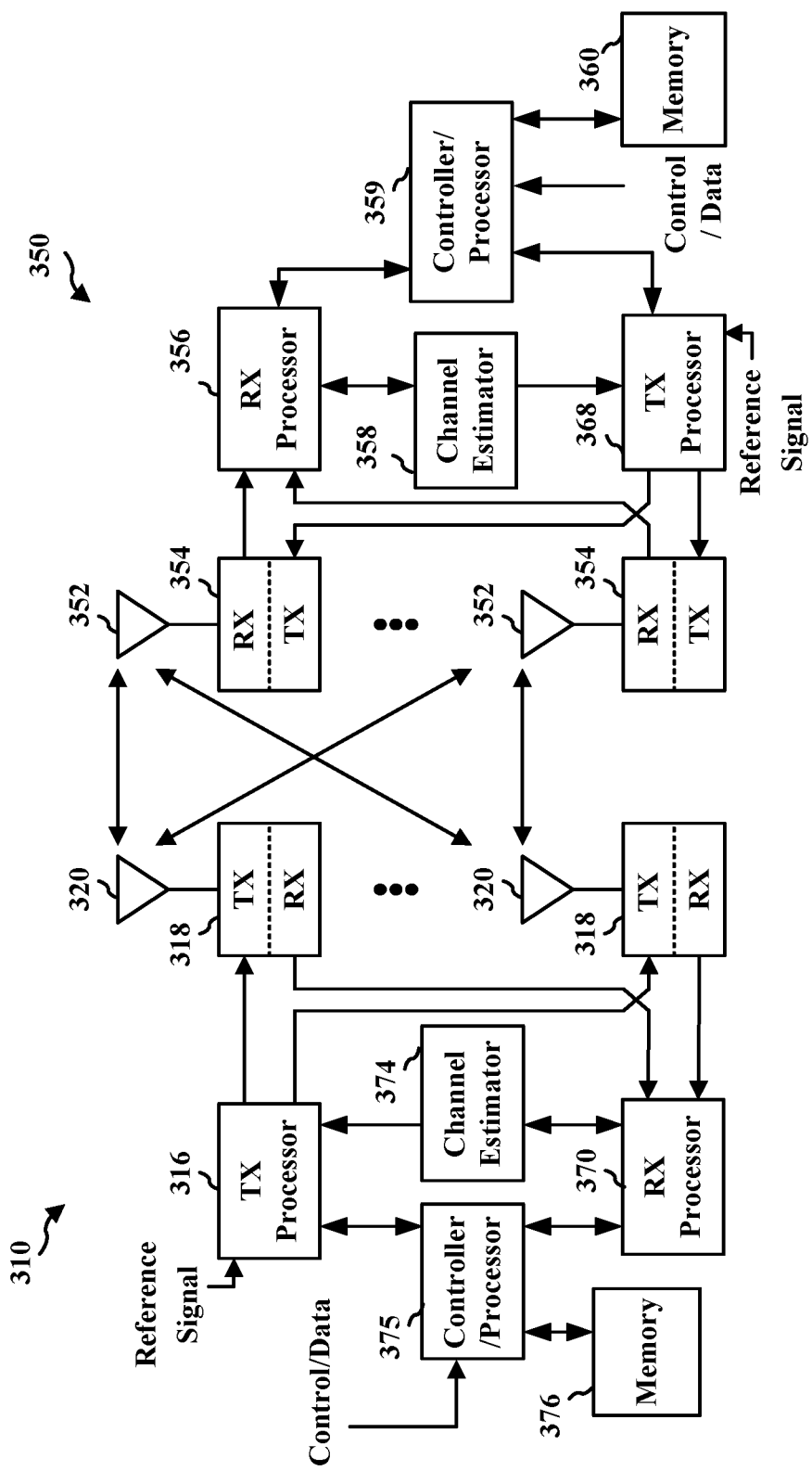
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIA/10 antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with, for example, communicatively coupled with, a memory 360 that stores program code(s), for example, processor-readable code(s), and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with, for example, communicatively coupled with, a memory 376 that stores program code(s), for example, processor-readable code(s), and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. Furthermore, one or more of TX processor 368, the RX processor 356, and the controller/processor 359 may include at least one processor configured to perform the functionality illustrated in the flowchart with reference to FIG. 11, where the at least one processor controls or instructs one or more components illustrated in UE 350 to perform various functions.

At least one of the TX processor 316, the RX processor 370, and the controller/processor 375 may be configured to perform aspects in connection with 199 of FIG. 1. Furthermore, one or more of TX processor 316, the RX processor 370, and the controller/processor 375 may include at least one processor configured to perform the functionality illustrated in the flowchart with reference to FIG. 12, where the at least one processor controls or instructs one or more components illustrated in BS 310 to perform various functions.

Figure 4:
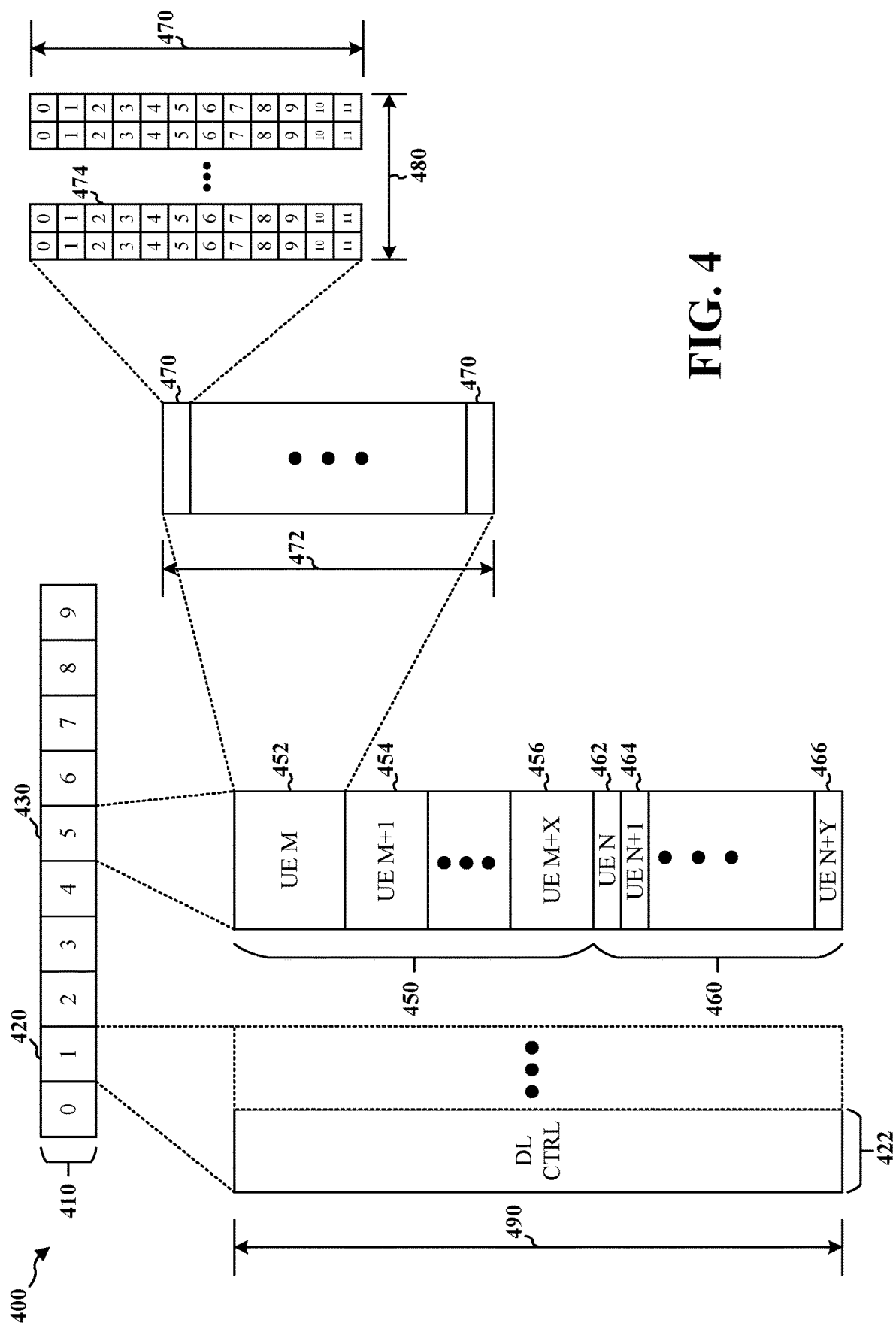
FIG. 4 illustrates an example of a resource configuration for coexistence of single resource block and multi-resource block uplink transmissions, in accordance with some aspects of the present disclosure.

FIG. 4 illustrates an example of a resource configuration 400 for coexistence of single resource block and multi-resource block uplink transmissions. Resource configuration 400 may be used for communication over a shared radio frequency spectrum band between multiple UEs 104 and base stations 102 via a carrier 410, which may be examples of the corresponding devices described with reference to FIGS. 1 and 3.

System resources of carrier 410 may be divided in time, e.g., into a plurality of transmission time intervals (TTIs). In some aspects, resources associated with a single TTI may be allocated either for uplink or downlink information (e.g., TTIs may be time division duplexed). As an example, base station 102 may allocate TTI 420 as a downlink TTI for the carrier, while TTI 430 may be allocated for uplink transmissions.

Carrier 410 may be associated with a frequency spectrum 490 (e.g., 50 MHz, 100 MHz, 200 MHz, 400 MHz), and may have a common synchronization signal (e.g., primary synchronization signal (PSS), secondary synchronization signal (SSS), etc.) and broadcast channels (e.g., including system information such as a master information block (MIB), system information blocks (SIBs), etc.) that carry common system information for the carrier 410. TTI 420 may contain a control channel 415, which may include uplink resource allocations for TTI 430. Control channel 422 may occupy a portion of the time-frequency resources of TTI 420 (e.g., spanning the frequency spectrum 490 for a portion of the time resources of TTI 420, etc.). The remaining time-frequency resources of TTI 420 may be allocated for transmission of downlink data.

TTI 430 may additionally be associated with frequency spectrum 490. In some cases, a base station 102 may divide frequency spectrum 490 into a first contiguous waveform bandwidth region 450 and a second contiguous waveform bandwidth region 460. In some aspects, the first contiguous waveform bandwidth region 450 and the second contiguous waveform bandwidth region 460 may span respective fractions of the frequency spectrum 490. In aspects of the present disclosure, the narrowest frequency division for a waveform type associated with a time duration (e.g., TTI 420, TTI 430) may be a resource unit or a subcarrier. As an example, each of the regions in the first contiguous waveform bandwidth region 450 (e.g., 452, 452, 456) may be a grouping of multiple RBs. In another example, each of the regions in the second contiguous waveform bandwidth region 460 (e.g., 462, 462, 466) may be a single resource block having multiple resource units or subcarriers. In some aspects, a UE communicating over frequency spectrum 490 may be allocated (e.g., via control channel 422 information) a single resource block associated with the second contiguous waveform bandwidth region 460. In other aspects, the UE communicating over the frequency spectrum 490 may be allocated (e.g., via control channel 422 information) a multi-RB associated with the first contiguous waveform bandwidth region 450. Different regions may also have different contiguous frequency parameters (e.g., bandwidth, subcarrier based frequency hopping, resource unit based frequency hopping, number of subcarriers or resource units in each contiguous section of an allocation, number of subcarriers or resource units between contiguous sections, etc.). In some aspects, each of the regions in either of the first contiguous waveform bandwidth region 450 or the second contiguous waveform bandwidth region 460 may use different cyclic shift ramping parameters (e.g., cyclic shift step size).

In some aspects, the first contiguous waveform bandwidth region 450 may be reserved for contiguous waveform transmission and wider band transmissions (compared to narrow band transmissions in the second contiguous waveform bandwidth region 460). Multiple resource blocks may be assigned to a given UE (e.g., via control channel 422 information). These resource blocks may be located next to each other in frequency (e.g., they may be contiguous). In the present example, each of the RB regions (e.g., 452, 454, 456) in first contiguous waveform bandwidth region 450 may include multiple resource blocks. In aspects of the present disclosure, during an uplink TTI 430, a UE may transmit over one of the first contiguous waveform bandwidth region 450, the second contiguous waveform bandwidth region 460, or a narrowband communication bandwidth region (not shown).

In some aspects, the TTI 430 may include a control bandwidth region and a shared bandwidth region of the carrier 410. For example, control bandwidth region may be used for control channel transmissions (e.g., non-data associated uplink channels) such as PUCCH transmissions or PRACH transmissions. The shared bandwidth region may be used for data transmissions, or other transmissions, and may be allocated or divided into bandwidth portions associated with interlaced and contiguous uplink transmissions. Additionally, sounding reference signal (SRS) transmissions may be mapped to contiguous resource blocks of the carrier 410. For example, UEs 104 configured for operation using contiguous frequency uplink data or control transmissions may also use contiguous SRS resource blocks. In some cases, SRS may be dynamically triggered, in which case the trigger may include dynamic indication of a waveform type for the SRS.

In the present example, the control bandwidth region includes the resource block regions 452, 454, 456, 462, 464, 466. These regions within the control bandwidth region may be used for transmission of control transmissions such as PUCCH, PRACH, SRS, etc. UEs configured for operation over the carrier 410 may support contiguous frequency transmission over respective regions in the control bandwidth region 425, and may be semi-statically configured for contiguous frequency transmission. Each uplink channel (e.g., PUCCH, PRACH, etc.) or uplink channel information (UCI) format may be configured with an operating bandwidth, a waveform type, or the like. In the example illustration of FIG. 4, each of RB regions 452, 454, 456, 462, 464, 466 may represent control transmissions associated with different UEs 104. As illustrated in FIG. 4, each of the resource block regions 452, 454, 456 includes multiple resource blocks 470, and each of the RB regions 462, 464, 466 includes a single resource block 470. Additionally, resource blocks 470 may be further defined in terms of time. For example, a contiguous pattern of resource blocks 470 may be defined for a time duration 480. In some cases, time duration 440 may refer to one or more TTIs for which the resource blocks 470 are allocated to different UEs. In some examples different configurations for the resource blocks 470 may be provided for different time durations 480 (e.g., different subframes may be configured according to different contiguous frequency parameters for a bandwidth region). Other time durations may have similar or different allocation or ordering of resource blocks 470.

The resource configuration 400 may be employed by BSs such as the BSs 102/180 and 310 and UEs such as the UEs 104 and 350 to communicate over the frequency spectrum 490. The frequency spectrum 490 may have channel bandwidth of about 20 megahertz (MHz) or about 100 MHz and a SCS of about 30 kHz or about 120 kHz. The frequency spectrum 490 may be located at any suitable frequencies. In some implementations, the frequency spectrum 490 may be at about 3.5 GHz, 6 GHz, or 60 GHz. The resource configuration 400 allocates resources at a resource block (RB)-granularity level.

In the second contiguous waveform bandwidth region 460, each region includes one RB 470 that spans a subband 472 of the frequency spectrum 490. Thus, the regions 462, 464, 466 have a granularity at an RB level. The RBs 470 are indexed from 0 to 11. Each RB 470 may span about twelve subcarriers 474 in frequency and a time period 480. The time period 480 may span any suitable number of OFDM symbols. In some implementations, the time period 480 may include one or more TTIs, where each TTI may include about fourteen OFDM symbols.

The use of either a single RB or multi-RBs having contiguous frequencies for an allocation in the frequency spectrum 490 allows a transmitter to transmit at a higher power level than when an allocation occupies interlaced frequencies. As an example, the frequency spectrum 490, under a SCS of 120 KHz, may have a single RB span 1.44 MHz that may translate to about 24.58 dBm in transmit power while providing a maximum allowable PSD level of about 23 dBm/MHz such that a transmitter (e.g., the UEs 104 and 350) may have a power amplifier (PA) capable of transmitting up to about 23 dBm. Distributing frequency occupancy of an allocation with multiple RBs may allow the transmitter to transmit at full power of about 23 dBm while maintaining a PSD level of lesser than 23 dBm/MHz. Thus, the use of single RB and/or multi-RBs with contiguous frequencies for resource allocation can provide better power utilization and enhance UE frequency multiplexing.

In an aspect, the resource configuration 400 may be applied to a PUCCH, a PUSCH, and a PRACH to provide a power boost at a transmitter. For example, a UE may transmit a random access preamble to a BS 102 during an initial network access over a PRACH channel using RACH resources that correspond to one of the RB regions 462, 464, 466 or RB regions 452, 454, 456, transmit UL control information to a BS over a PUCCH channel using one of the RB regions 452, 454, 456, 462, 464, 466, and/or transmit UL data over a PUSCH using one of the regions in either the first contiguous waveform bandwidth region 450 and the second contiguous waveform bandwidth region 460. In one or more implementations, the resource configuration 400 may be applied to spectrum sharing, where a UE 104 or a BS 102/180 may transmit a medium reservation signal using a single-RB frequency structure or a multi-RB frequency structure, for example, RB region 452, to improve medium sensing performance.

A network may configure a set of time and frequency resources as RACH occasions, in time and frequency, and RACH preamble indices. A mapping between an SSB and the RACH occasions and preamble indices enable the UE to select an appropriate RACH occasion and preamble index from the set of time and frequency resources in order to convey a particular SSB index to the network. The base station 102 may respond to receipt of a RACH preamble (e.g., RACH Msg 1) with downlink communication based on the indicated SSB index. For example, the base station 102 may transmit a RACH response message (e.g., RACH Msg 2) based on the indicated SSB index.

For contention free random access (CFRA), a network configures a set of dedicated time-frequency RACH occasions and preamble indices corresponding to a subset of SSBs. The network may also configure a threshold for selecting SSB/CSI-RS to perform CFRA. The network provides the combination of a dedicated set of RACH occasions (time and frequency resource) and preamble indices per SSB to the UE 104. Thus, the network provides a set of SSBs, each having a corresponding RACH time/frequency location and RACH preamble index. For contention based random access, the network configures an Reference Signal Received Power (RSRP) threshold for selecting an SSB. The UE 104 measures the RSRP of all detected SSBs. If there are multiple SSBs configured for CFRA that have RSRP measurements satisfying a threshold, the UE 104 can flexibly select one of the multiple SSBs for CFRA preamble transmission. If there is no SSB that is configured for CFRA and having an RSRP over the threshold, the UE 104 can select any SSB. For contention free random access, the UE 104 measures the RSRP of different SSBs and reports the measurements to the network.

After selecting one SSB, the UE 104 uses the corresponding dedicated RACH occasion and preamble index for the selected SSB to transmit a RACH preamble (e.g., RACH Msg 1) to the network using a time and frequency resource and preamble index corresponding to the selected SSB. As the configured resources are dedicated for a particular SSB, the network can identify which UE transmitted the RACH preamble and may respond by transmitting a random access response (e.g., Msg 2) to the UE 104 through the selected SSB index.

RACH parameters for CFRA resources may be based, e.g., on a dedicated configuration such as a RACH configuration Information Element (IE) (e.g., RACH-ConfigDedicated IE). The IE may provide information about resources configured for RACH Msg 1, e.g., based on a System Information (SI) request. The RACH configuration information may indicate CFRA resources in time and frequency. The RACH configuration information may indicated CFRA occasions based on RACH resources configured for CFRA and based on an SSB per RACH occasion. CFRA resources may be indicated using an SSB resource list with a corresponding RACH occasion index. A RACH preamble index may also be indicated for each of the list of SSBs. An RSRP threshold may be indicated for selection of the SSB for CFRA. The network may configure the RSRP threshold for use by the UE 104 in selecting SSB for performing CFRA. The UE 104 may measure the RSRP of all detected SSBs, and may determine whether any of the SSBs meet the configured RSRP threshold. If the RSRP for an SSB meets the RSRP threshold, the UE 104 may select the SSB for use in determining a preamble transmission for CFRA. Similar information may be provided for CSI-RS configured for CFRA, e.g., including RACH occasion indexes, RACH preamble indexes, and/or RSRP threshold information for a set of CSI-RS configured for CFRA.

As described, CFRA SSB resources may provide one RACH preamble index and one RACH time/frequency index for each corresponding SSB/CSI-RS. This configuration of the RACH preamble indices and time/frequency resources for RACH corresponding to different SSBs may be indicated by the base station 102 to the UE 104. In order to transmit a RACH based on a received SSB/CSI-RS, the UE 104 selects the corresponding RACH preamble index and one RACH time/frequency resource indicated in the configuration received from the base station 102. This enables the base station 102 to identify the SSB based on the RACH preamble index and time/frequency resource(s) of the received RACH.

In another example, a generic RACH (e.g., RACH-ConfigGeneric IE) configuration may be used to specify the cell specific random-access parameters both for regular random access as well as for beam failure recovery. The configuration may indicate RACH resources in time, e.g., using a PRACH configuration index (such as a prach-ConfigurationIndex), as well as frequency resources for the RACH. The frequency resources for the RACH may indicate whether frequency division multiplexing (FDM) applies for Msg 1 (e.g., msg1-FDM) and/or a starting frequency for Msg 1 (e.g., msg1-FrequencyStart) for the RACH. Such a generic RACH configuration IE may include a generic RACH configuration for RACH and beam failure recovery, including any of a PRACH configuration index, Msg 1 FDM information, Msg 1 starting frequency information, zero correlation zone configuration information, a target power for receiving a preamble, a transmission maximum for a preamble, power ramping step information, and/or information about a window for receiving a RACH response.

Prior to the RACH procedure, the base station 102 may transmit system information such as remaining minimum system information (RMSI) and the UE 104 may receive the system information. The UE 104, however, may not have established a radio resource control (RRC) connection and may not be configured with UE specific parameters.

The UE 104 may use a random access procedure associated with contention based random access (CBRA) in order to communicate with the base station 102. For example, the UE 104 may use the random access procedure to request an RRC connection, to re-establish an RRC connection, resume an RRC connection, etc. A four-step RACH procedure includes the exchange of four messages. Specifically, the UE 104 may initiate the message exchange by sending, to the base station 102, a first RACH message (e.g., Msg 1) including a preamble. The base station 102 responds to the first RACH message by sending a second RACH message (e.g. Msg 2) including a random access response (RAR). Msg 2 may include an identifier of the RACH preamble, a time advance (TA), an uplink grant for the UE to transmit data, cell radio network temporary identifier (C-RNTI), and/or a back-off indicator. Upon receiving the RAR, the UE 104 transmits a third RACH message (e.g., Msg 3) to the base station that may include a RRC connection request, an RRC connection re-establishment request, or an RRC connection resume request, depending on the trigger for the initiating the random access procedure. The base station 102 then completes the four-step RACH procedure by sending a fourth RACH message (e.g., Msg 4). The fourth RACH message may include a RACH response message that includes timing advancement information, contention resolution information, and/or RRC connection setup information.

For CBRA, the network may configure a set of RACH occasions, in time-frequency resources, and preamble indices. The network may allow a cyclic mapping from SSBs to the RACH occasions and preamble indices so that a UE 104 can select an SSB and transmit Msg1 by selecting an appropriate RACH occasion and preamble index from the set of corresponding RACH occasions and preamble indices. The UE 104 conveys the SSB index to the network according to the use of time-frequency resources to send a preamble corresponding to the preamble index for a particular SSB. The network responds to the Msg1 by transmitting a Msg 2 through the conveyed SSB index. After the completion of four messages of a four-step RACH procedure, the network may identify the UE 104 that transmitted Msg1 and may establish a connected mode of operation with the UE 104. In some implementations, instead of the network providing a mapping between time/frequency resources for each of the SSBs, the SSBs may be cyclically mapped to a group of time/frequency resources. Thus, a UE selects from among the group of time/frequency resources using the cyclical mapping and conveys the message to the network.

Referring additionally to Table 1 (below), during operation, the UE 104 may execute an implementation of an NR RACH procedure, according to a four-step NR RACH message flow, due to the occurrence of one or more RACH trigger events. Suitable examples of RACH trigger events may include, but are not limited to: (i) the UE 104 performing an initial access to transition from an RRC_IDLE state to RRC_CONNECTED_ACTIVE state; (ii) the UE 104 detecting downlink (DL) data arrival while in an RRC_IDLE state or RRC_CONNECTED INACTIVE state; (iii) the UE 104 determining UL data arrival from higher layers during RRC_IDLE state or RRC_CONNECTED INACTIVE state; (iv) the UE 104 performing a handover from another station to the base station 102 during the connected mode of operation; and (v) the UE performing a connection re-establishment procedure such as a beam failure recovery procedure.

The NR RACH procedure may be associated with a CBRA procedure. In one or more implementations, a contention-based NR RACH procedure may correspond to the following RACH trigger events: an initial access from RRC_IDLE to RRC_CONNECTED ACTIVE; UL data arrival during RRC_IDLE or RRC_CONNECTED INACTIVE; and a connection re-establishment.

On the occurrence of any of the above RACH trigger events, the execution of the NR RACH procedure may include the four-step NR RACH message flow, where the UE 104 exchanges messages with the base station 102 to gain access to a wireless network and establish a communication connection. The messages may be referred to as random access messages 1 to 4, RACH messages 1 to 4, or may alternatively be referred to by the PHY channel carrying the message, for example, message 3 PUSCH.

Table 1: Four-Step NR RACH Procedure, Including Messages and Message Content Transmitted Over Corresponding Physical (PHY) Channel(s).

| PHY Channel | Message | Message content |
|---|---|---|
| PRACH | Msg 1 | RACH Preamble |
| PDCCH/PDSCH | Msg 2 | Detected RACH preamble ID, TA, TC-RNTI, backoff indicator, UL/DL grants |
| PUSCH | Msg 3 | RRC Connection request (or scheduling request and tracking area update) |
| PDCCH/PDSCH | Msg 4 | Contention resolution message |

Referring additionally to Table 2 (below), during operation, the UE 104 may execute an implementation of an NR RACH procedure, according to a two-step NR RACH message flow, due to the occurrence of one or more RACH trigger events. In both CBRA and CFRA procedures, Msg A includes a preamble transmission on PRACH and a payload transmission on PUSCH. The base station 102 transmits a Msg B in response to the Msg A unlike Msg 2 in the case of the four-step RACH procedure. Message B includes a random access response transmission on PDCCH/PDSCH and a contention resolution transmission on PDCCH/PDSCH. For CFRA procedures, upon receiving a network response, the UE 104 can end the random access procedure.

Table 2: Two-Step NR RACH Procedure, Including Messages and Message Content Transmitted Over Corresponding Physical (PHY) Channel(s).

| PHY Channel | Message | Message content |
|---|---|---|
| PRACH | Msg A | RACH Preamble |
| PUSCH | Msg A | RRC Connection request (or scheduling request and tracking area update) |
| PDCCH/PDSCH | Msg B | Detected RACH preamble ID, TA, TC-RNTI, backoff indicator, UL/DL grants |
| PDCCH/PDSCH | Msg B | Contention resolution message |

In other implementations, the execution of the NR RACH procedure may include the two-step NR RACH message flow, where the UE 104 exchanges messages with the base station 102 to gain access to a wireless network and establish a communication connection. The messages may be referred to as random access messages A and B, RACH messages A and B, or may alternatively be referred to by the PHY channel carrying the message, for example, message A PUSCH.

Figure 5:
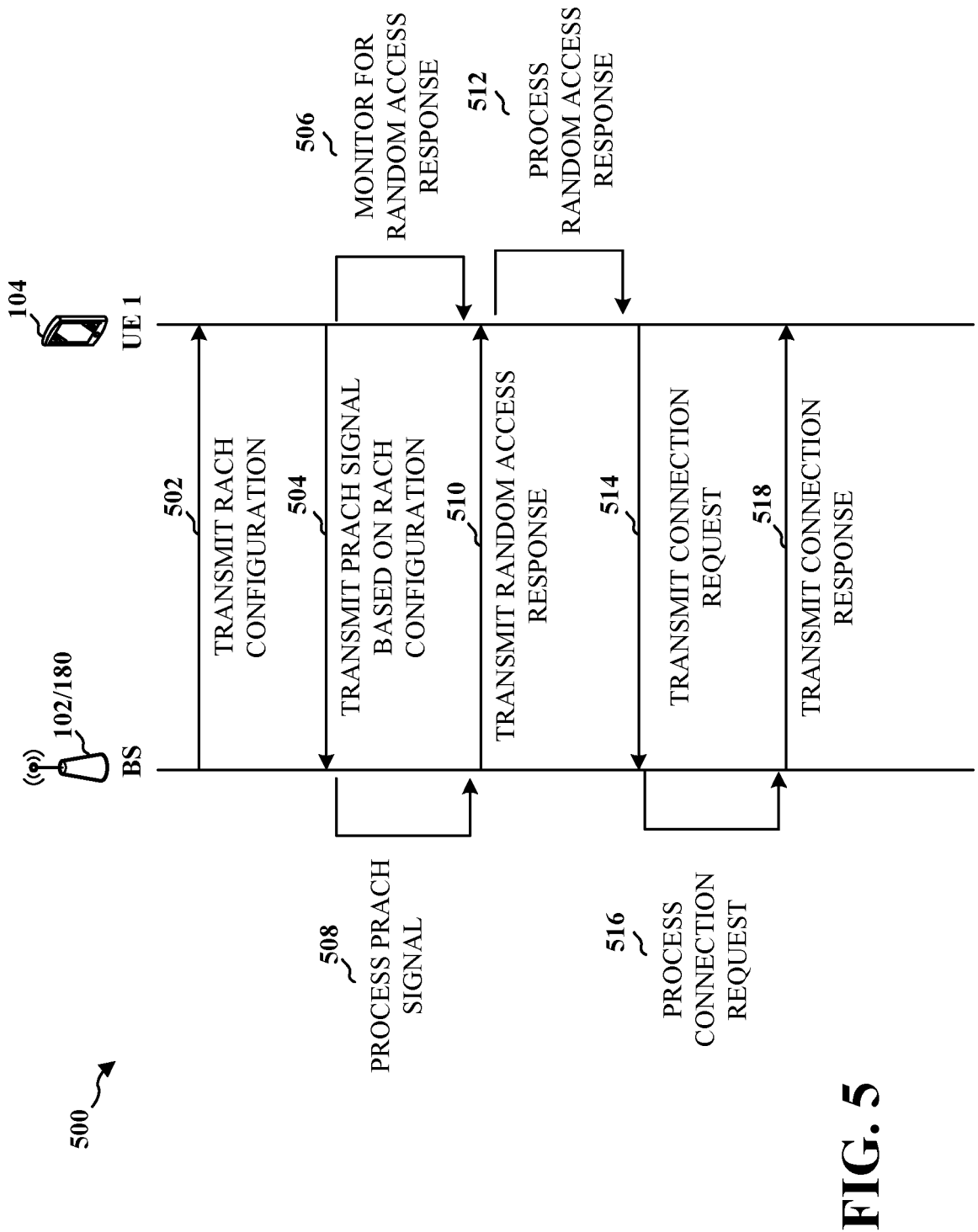
FIG. 5 is a signaling diagram of a random access procedural process, in accordance with some aspects of the present disclosure.

FIG. 5 is a signaling diagram of a network random access process 500, in accordance with some aspects of the present disclosure. The process 500 may be implemented among a BS and a UE. The BS may be similar to the B Ss 102, 180 and 310. The UE may be similar to the UEs 104 and 350. The process 500 can be executed by computing devices (e.g., a processor, processing circuit, and/or other suitable component) of the BS 102/180 and the UE 104. As illustrated, the process 500 includes a number of enumerated steps, but implementations of the process 500 may include additional steps before, after, and in between the enumerated steps. In some implementations, one or more of the enumerated steps may be omitted or performed in a different order.

At 502, the BS 102/180 transmits a RACH configuration in a network (e.g., the network 100) to the UE 104. In some implementations, the BS 102/180 may broadcast the RACH configuration in a SIB (e.g., SIB Type 2). The RACH configuration may indicate random access resources in a frequency spectrum (e.g., the frequency spectrum 490). The resources may span contiguous frequencies when the SCS in the frequency spectrum is sufficiently large (e.g., SCS of 120 KHz). The BS 102/180 may assign the PRACH resources based on a PSD parameter of the frequency spectrum, a transmit power limit of the UE 104, channel coherency, sequence separation, and/or a numerology (e.g., an SCS) used for communicating with the UE 104. In addition, the RACH configuration may indicate random access sequences or information for generating random access sequences. In some implementations, certain random access sequences may be transmitted on certain PRACH resources.

At 504, the UE 104 may transmit a PRACH signal based on the RACH configuration to initiate an access to the network. In some aspects, the UE 104 transmits a random access preamble on the PRACH. At 506, after transmitting the PRACH signal, the UE 104 may monitor for a random access response.

At 508, upon detecting the PRACH signal, the BS 102/180 processes the PRACH signal. For example, the BS 102/180 may monitor for a PRACH signal in the resources indicated in the configuration and based on the sequences indicated in the configuration. The BS 102/180 may determine uplink transmission timing of the UE 104 and assign a UL resource and a temporary identifier (ID) to the UE 104 for sending a subsequent message based on the received PRACH signal. The UL resource may or may not be distributed over the frequency spectrum as shown in the resource configuration 400 or random access transmission scheme 500 described above. The BS 102/180 may identify a next message (e.g., a connection request) from the UE 104 by the temporary ID.

At 510, the BS 102/180 transmits a random access response indicating the timing advance information, the uplink resource, and the temporary ID. After detecting the PRACH signal (or RACH message 1), the network (e.g., 5G NR gNB) may not be aware of the UE capability. In this regard, a legacy RACH message 2 can be sent to the UE no matter whether the UE has a high capability or a low capability to grant the same RACH message 3 resource.

At 512, upon receiving the random access response, the UE 104 processes the random access response. The UE 104 may obtain information associated with the UL resource, the temporary ID, and the timing advance information from the random access response.

At 514, the UE 104 transmits a connection request to the BS 102/180 based on the UL resource, the temporary ID, and the timing advance information. In some aspects, the connection request may correspond to the RACH message 3. The UE 104 may communicate an indication of its capability about wideband PUCCH. This indication may be in the form of an uplink resource bandwidth capability. The uplink resource bandwidth capability may correspond to information indicating the UE's capability about wideband PUCCH such that the UE 104 can transmit a PUCCH signal on a single-RB resource or multi-RB resource. The UE 104 may transmit a RACH message 3 to indicate its capability so that the network (e.g., 5G NR gNB) can know the UE capability after detecting the RACH message 3. In other aspects, the UE 104 may transmit a RACH message A to indicate its capability.

At 516, upon receiving the connection request, the BS 102/180 processes the connection request. At 518, the BS 102/180 acknowledges the connection request by transmitting a connection response to the UE 104. In some aspects, the connection response may correspond to the RACH message 4. In this regard, the BS can indicate together with the RACH message 4 which PUCCH bandwidth to use. In other aspects, the connection response may correspond to a RACH message B, in which the BS can indicate together with the RACH message B which PUCCH bandwidth to use.

In the context of 5G NR, the temporary ID may be referred to as a temporary cell-radio network temporary identifier (C-RNTI). The PRACH signal, the random access response, the connection request, and the connection response may be referred to as message 1, message 2, message 3, and message 4, respectively.

Figure 6:
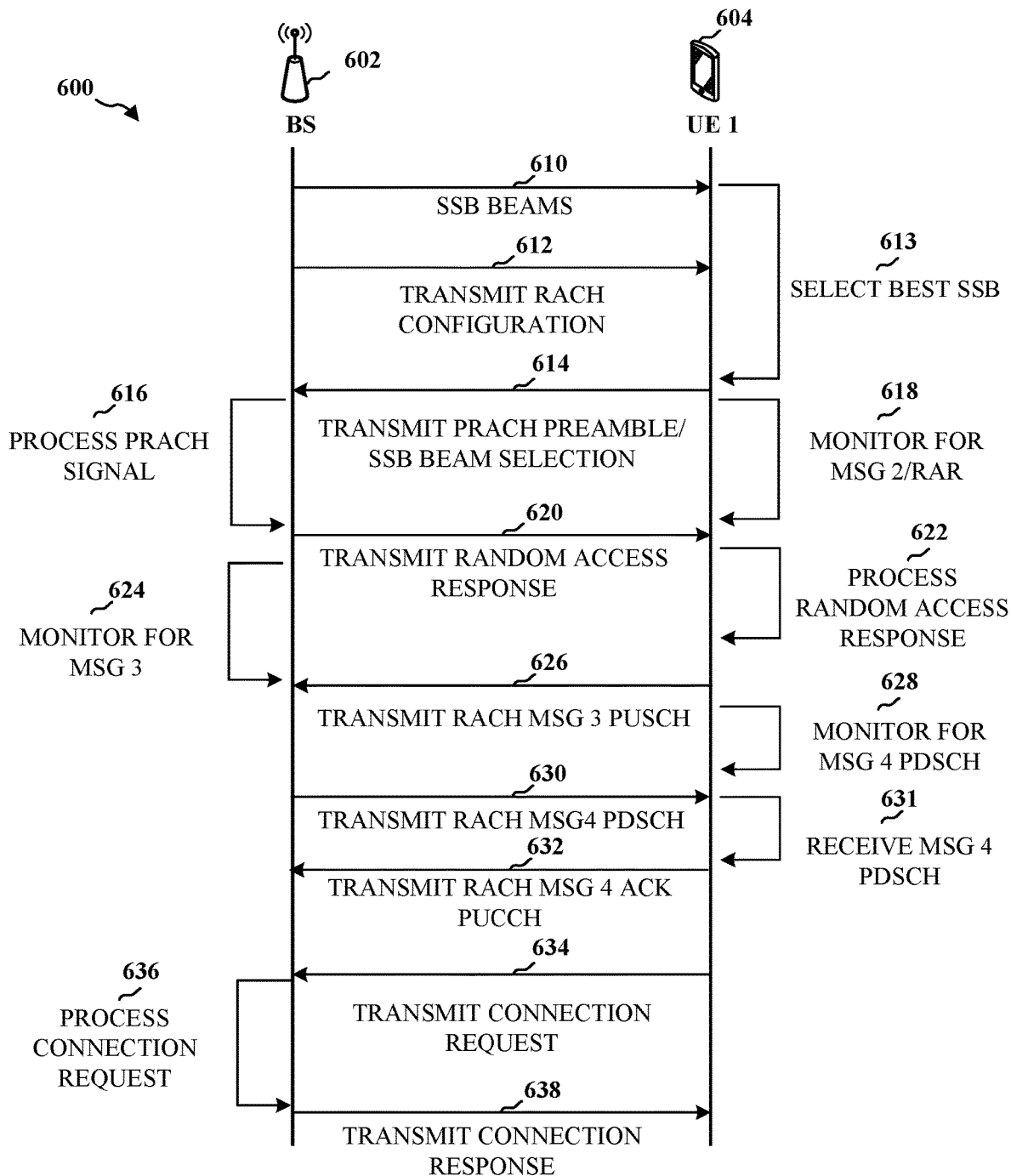
FIG. 6 is a signaling diagram of a random access procedural process, in accordance with some aspects of the present disclosure.

FIG. 6 is a signaling diagram of a random access procedural process 600, in accordance with some aspects of the present disclosure. The process 600 may be implemented between a UE 604 and a base station 602 in an access network, in which the UE 604 transmits a RACH Msg 3 in response to a RACH response (e.g., Msg 2) to indicate the UE's capability about wideband PUCCH during initial access.

The BS 602 may be similar to the BSs 102, 180, 310 and 602. The UE may be similar to the UEs 104, 350 and 604. The process 600 can be executed by computing devices (e.g., a processor, processing circuit, and/or other suitable component) of the BS 102/180 and the UE 104. As illustrated, the process 600 includes a number of enumerated steps, but implementations of the process 600 may include additional steps before, after, and in between the enumerated steps. In some implementations, one or more of the enumerated steps may be omitted or performed in a different order.

At 610, the UE 604 receives at least one SSB of a burst of SSBs on different beams with respective spatial filters.

At 612, the base station 602 may transmit a RACH configuration that configures the UE 604 for RACH based on configurable RACH parameters. The RACH configuration may indicate a predetermined threshold for comparing measured SSBs at the UE 604. The RACH configuration also may indicate a scaling factor for beam shaping of uplink transmit beams during the RACH procedure (e.g., radiating narrower beams). In some aspects, the base station 602 may indicate a cell ID or a frequency range for the SSB to which the RACH parameters apply.

At 613, the UE 604 selects an SSB for which the UE 604 can transmit a RACH message, e.g., a RACH preamble or RACH Msg 1. In some aspects, the UE 604 may scan the burst of SSBs and select the SSB with the best measured beam.

At 614, the UE 604 transmits a RACH Msg 1. In a first step of the RACH procedure, for example, UE 604 may transmit a message (RACH Msg 1), which may be referred to as a random access request message, to the base station 602 via a physical channel, such as a physical random access channel (PRACH). For example, RACH Msg 1 may include one or more of a RACH preamble and a resource requirement. The UE 604 may transmit the RACH Msg 1 on a random access opportunity (RO). In an aspect, the RACH preamble may be a relatively long preamble sequence, which may be easier for the base station 602 to receive than an OFDM symbol. In an aspect, the UE 604 may select a beam for transmission of the RACH Msg 1 based on received SSBs transmitted by the base station 602. In some aspects, the RACH Msg 1 is transmitted using the RACH parameters for the selected SSB according to the RACH configuration received from the base station 602. The RACH parameters may include time/frequency resources for the RACH (e.g., RACH occasions), a RACH preamble index, etc. In some aspects, the RACH Msg 1 may be transmitted with a beam width that corresponds to that of the selected SSB.

At 616, the base station 602 receives the RACH Msg 1 from the UE 604 and processes the RACH Msg 1. The base station 602 determines the selected SSB from the RACH Msg 1 based on the RO on which Msg 1 is received.

At 618, the UE 604 can monitor the channel for a response from the base station 602. For example, the UE 604 may monitor for a RACH Msg 2. In an aspect, the uplink component 198 may monitor the PDCCH during a RAR window based on the RACH Msg 1 to detect a PDCCH portion of the RAR message as a DCI format 1_0 with a cyclic redundancy check (CRC) scrambled by a RA-RNTI corresponding to the RACH Msg 1 and receive the PDSCH portion of the RAR message as a transport block in a corresponding PDSCH within the RAR window.

Once the base station determines, at 616, the SSB selected by the UE 604, the base station 602 may proceed to transmit downlink communication to the UE 604. The base station 602 may respond to receiving the RACH Msg 1 by transmitting a second message (RACH Msg 2), which may be referred to as a RAR message. The RAR message may include a PDCCH portion and a PDSCH portion. For example, at 620, the base station 602 may respond to the RACH Msg 1 by transmitting a random access response via RACH Msg 2. The RACH Msg 2 can include a physical downlink control channel and/or physical downlink shared channel.

At 622, the UE 604 can process the random access response. In some aspects, the uplink component 198 may pass the transport block to higher layers, which may parse the transport block for a random access preamble identity (RAPID) associated with the RACH Msg 1. If the higher layers identify the RAPID in the transport block, the higher layers may indicate an uplink grant to the uplink component 198 at the physical layer. This is referred to as RAR UL grant in the physical layer. For example, RACH Msg 2 may include one or more of a detected preamble identifier (ID), a timing advance (TA) value, a temporary cell radio network temporary identifier (TC-RNTI), a backoff indicator, or an UL grant.

At 624, the base station 602 may monitor for transmission of the RACH Msg 3 using a refined receive beam at the base station 602 as determined at 628.

At 626, the UE 604 transmits the RACH Msg 3 to the base station 602. In response to receiving the RACH Msg 2 PDSCH portion, the UE 604 transmits to the base station 602 a third message (RACH Msg 3), which may be an RRC connection request or a scheduling request, via a physical uplink channel such as PUSCH based on the RAR UL grant provided in the RACH Msg 2 of the base station 602. In some aspects, the RACH Msg 3 may be transmitted on a refined beam to the base station 602.

In some aspects, the RACH Message 3 can carry an indication of the UE's wideband PUCCH capabilities based on the uplink configuration. In some aspects, the UE 104 may include an indication of whether it can operate with wideband PUCCH. For example, the UE can include a flag that denotes a binary indication (or true/false indication) of its wideband PUCCH capability. The UE 104 may include the flag within a logical channel identifier (LCD) field of a MAC subheader excluding content. In some aspects, the LCID MAC subheader may include a 6-bit field that can carry up to 64 values. The flag may be provided by at least one of the values. In this regard, one of the LCID MAC subheader values can indicate the wideband PUCCH capability. In some aspects, if a corresponding MAC subheader is not present in the PUCCH signal (e.g., RACH Message 4), then the UE 104 may provide the wideband PUCCH capability flag using only legacy PUCCH signaling.

In other aspects, the UE 104 provides the LCID MAC subheader together with a MAC Control Element (MAC CE) as payload to indicate a maximum number of resource blocks the UE 104 may occupy for PUCCH in formats 0/1 to maximize the transmission power. The MAC CE may include a content portion that carries the maximum RB number indication. In still other aspects, the UE 104 may directly indicate a specified number of RBs for its PUCCH formats 0/1 in the RACH Message 3. The BS 102/180 may preconfigure a set of sizes for each PUCCH formats 0/1 (e.g., as described in connection with 704 of FIG. 7) for the UE 104 to select from. In this regard, the UE 104 may select among different default PUCCH resource tables. The UE 104 may select a default set of PUCCH resources based on the transmission power available and the applicable PSD limitations of the UE 104. The BS 102/180 knows which default set of PUCCH resources the UE 104 intends to utilize after the BS 102/180 receives the RACH Message 3, and the BS 102/180 grants by way of the RACH Message 4 with the PRI signaling pointing to the corresponding default set of PUCCH resources.

In some aspects, upon receiving the RACH Message 2 (or random access response) from the base station 602 and based on a current PRACH preamble transmission power, the UE 604 determines the specified number of RBs by determining a carrier-to-interference-plus-noise ratio (CINR) needed to achieve a reasonable detection performance. Further, based on a downlink pathloss measurement of the RACH Message 2 (or SSB) and current power headroom, the UE 604 can determine the number of RBs for PUCCH to maintain a similar (or corresponding) CINR. In some aspects, the calculation of the specified number of RBs can be expressed as:

$$NiB=\text{floor}((Target\_PUCCH\_TxPower/PSD\_Limit) \quad \text{Eq. (1),}$$

where NiB refers to the specified number of RBs for PUCCH. In some aspects, the UE 604 may obtain one or more measurements of the RACH Message 2 to determine the CINR and downlink pathloss measurement.

In other aspects, the UE 104 may include the indication of the UE's wideband PUCCH capability using an additional bit location in a MAC CE portion of the RACH Message 3. In other aspects, the UE 104 may include the indication of the UE's wideband PUCCH capability by scrambling the RACH Message 3 with different DMRS scrambling sequences. For example, the RACH Message 3 may be scrambled with a first DMRS scrambling sequence to denote a first UE capability such as support for a first PUCCH bandwidth capability (e.g., single-RB PUCCH). In another example, the RACH Message 3 may be scrambled with a second DMRS scrambling sequence different than the first DMRS scrambling sequence to denote a second UE capability such as support for a second PUCCH bandwidth capability (e.g., multi-RB PUCCH).

In still other aspects, the UE 104 may include the indication of the UE's wideband PUCCH capability by scrambling the RACH Message 3 with different PUSCH payload scrambling sequences. For example, the RACH Message 3 may be scrambled with a first PUSCH payload scrambling sequence to denote a first UE capability such as support for a first PUCCH bandwidth capability (e.g., single-RB PUCCH). In another example, the RACH Message 3 may be scrambled with a second PUSCH payload scrambling sequence different than the first PUSCH payload scrambling sequence to denote a second UE capability such as support for a second PUCCH bandwidth capability (e.g., multi-RB PUCCH).

The base station 602 may preconfigure multiple PRACH preamble lengths for a RACH process. To support legacy UEs, the base station 602 may support a first preamble length (e.g., 139). For non-legacy UEs with higher PUCCH capabilities (e.g., wideband), the base station 602 can support longer preamble sequences with a second preamble length (e.g., 571, 1151). In this regard, the base station 602 can configure multiple PRACH preamble lengths to support both legacy and non-legacy UEs. In some aspects, the indication of the UE's wideband PUCCH capabilities may be in terms of different random access preamble lengths. For example, the UE 604 may select a PRACH preamble sequence of different lengths to indicate its capability of wideband PUCCH. For example, the UE 604 may select a first preamble length (e.g., 139) to denote capability to support single-RB common PUCCH. In another example, the UE 604 may select a second preamble length (e.g., 571, 1151) to denote capability to support multi-RB (or wideband) PUCCH. The base station 602 may preconfigure separate sets of common PUCCH preamble lengths. For example, a first table may contain entries for single-RB PUCCH resources, where the UE 604 may utilize a preamble length of length 139 to denote its intention to use an entry in the first table for non-wideband PUCCH. In another example, a second table may contain entries for multi-RB PUCCH resources, where the UE 604 may utilize a preamble length of length 571/1151 to denote its intention to use an entry in the second table for wideband PUCCH. In this regard, the base station 602 may acknowledge and provide a resource allocation to the UE 604 by way of providing PM signaling in the RACH Message 4.

At 628, the UE 604 may monitor for transmission of the RACH Msg 4 at the UE 604 as determined at 632. At 630, the base station 602 transmits the RACH Msg 4 to the UE 604. In response to receiving the RACH Msg 3 by the UE 604, the base station 602 may transmit a fourth message (RACH Msg 4), which may be referred to as a contention resolution message, to UE 604 via a PDCCH and a PDSCH. For example, RACH Msg 4 may include a cell radio network temporary identifier (C-RNTI) for UE 604 to use in subsequent communications.

At 631, the UE 604 receives the RACH Msg 4 PDSCH. In some aspects, the RACH Msg 4 includes PRI signaling that indicates a PUCCH resource. At 632, upon receipt of the RACH Msg 4 PDSCH, the UE 604 may transmit a RACH Msg 4 acknowledgment message using the PUCCH resource indicated by the PM signaling in the downlink grant of the RACH Msg 4 PDSCH. Alternative to the implementation at step 626, the acknowledgment message to the RACH Msg 4 can carry an indication of the UE's wideband PUCCH capabilities.

At 634, the UE 604 transmits a connection request to the base station 602. In some aspects, the connection request may include uplink control information of the UE 604.

At 636, upon receiving the connection request, the base station 602 processes the connection request from the UE 604. At 638, the base station 602 acknowledges the connection request by transmitting a connection response to the UE 604.

Figure 7:
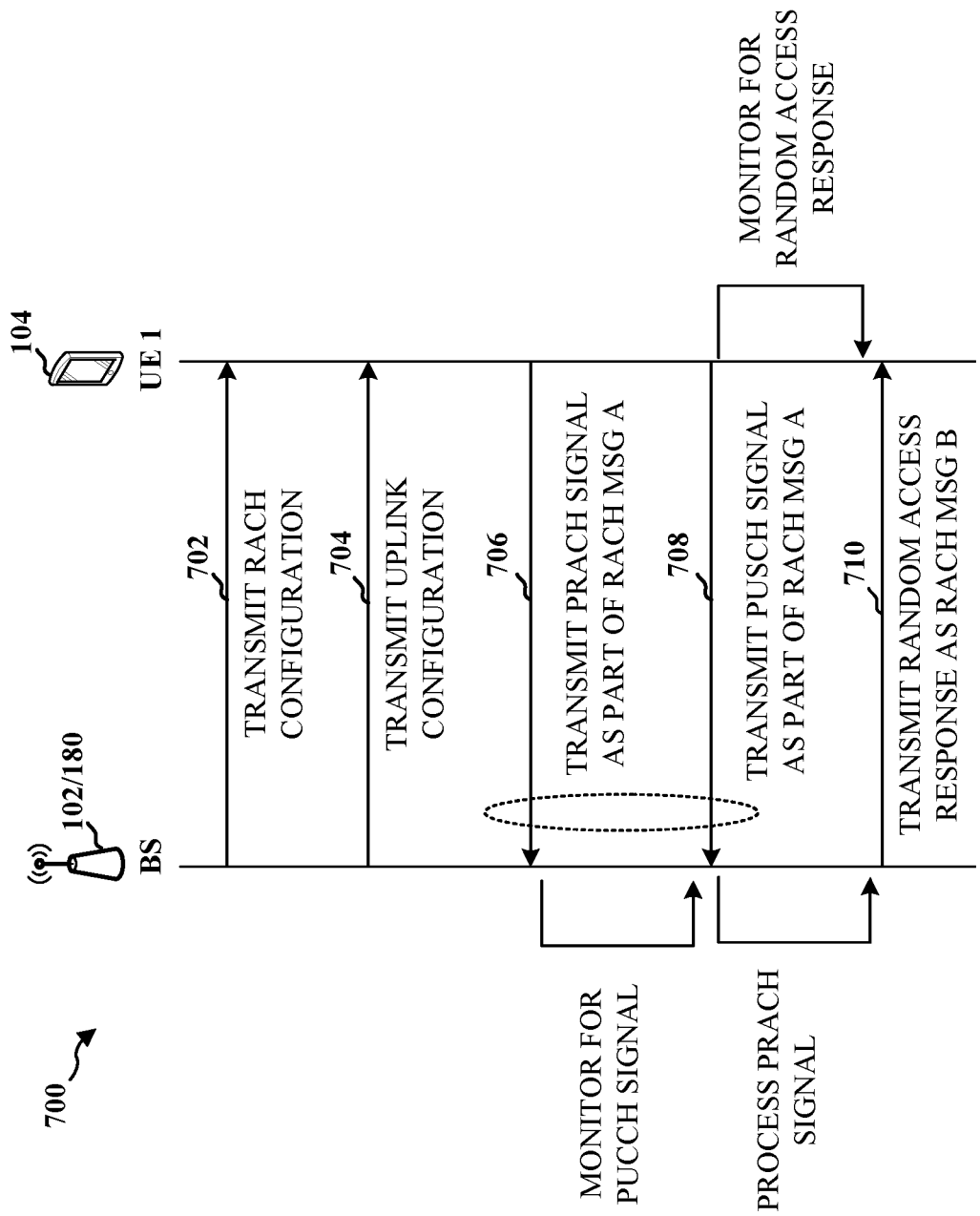
FIG. 7 is a signaling diagram of a random access procedural process, in accordance with some aspects of the present disclosure.

FIG. 7 is a signaling diagram of an uplink control communication process 700, in accordance with some aspects of the present disclosure. The process 700 may be implemented among a BS and a UE. The BS may be similar to the BSs 102, 180 and 310. The UE may be similar to the UEs 104 and 350. The process 700 can be executed by computing devices (e.g., a processor, processing circuit, and/or other suitable component) of the BS 102/180 and the UE 104. As illustrated, the process 700 includes a number of enumerated steps, but implementations of the process 700 may include additional steps before, after, and in between the enumerated steps. In some implementations, one or more of the enumerated steps may be omitted or performed in a different order.

At 702, the BS 102/180 transmits a RACH configuration resources in a frequency spectrum (e.g., the frequency spectrum 490) allocated to the UE 104 for various frequency bands. In an aspect, the BS 102/180 may semi-statically configure the UE 104 with PRACH resources for facilitating a two-step RACH process (e.g., RACH Message A, RACH Message B).

At 704, the BS 102/180 transmits an uplink configuration to the UE 104. The BS 102/180 may assign the resources based on a PSD parameter of the frequency spectrum, a transmit power headroom or a transmit power utilization factor (e.g., a transmit power limit) of the UE 104, channel coherency, sequence separation, and/or a numerology (e.g., an SCS) used for communicating with the UE 104. In addition, the configuration may indicate sequences assigned to the UE 104 or information for the UE 104 to generate specific baseband sequences. The baseband sequences may be used for feedback transmissions to indicate ACKs and/or NACKs. In an aspect, the BS 102/180 may semi-statically configure the UE 104 with an uplink resource (e.g., resources 510, 520) that corresponds to a respective PUCCH resource having either a single-RB allocation or multi-RB allocation (e.g., single-RB allocations 462, 464, 466, or multi-RB allocations 452, 454, 456). For example, the configuration may indicate a first set of uplink resources that corresponds to a single-RB frequency structure for uplink transmission of a PUCCH signal with a first transmission power and may indicate a second set of uplink resources that corresponds to a multi-RB frequency structure (e.g., including contiguous frequencies) for transmission of a PUCCH signal with a second transmission power greater than the first transmission power. In an implementation, the BS may broadcast the configuration in a SIB to all UEs (e.g., including UE 1) in a network (e.g., the network 100).

At 706, the UE 104 may transmit a PRACH signal (as part of a RACH Message A) based on the configuration to initiate an access to the network. For example, the UE 104 may select a PRACH resource from the preconfigured resource pool. The UE 104 may transmit the PRACH signal on the selected PRACH resource. Thereafter, the BS 102/180 monitors for a PUSCH signal (e.g., RACH Message A).

At 708, the UE 104 may transmit the RACH Message A on PUSCH. Thereafter, the UE 104 monitors for a random access response from the BS 102/180. In some aspects, the RACH Message A can carry an indication of the UE's wideband PUCCH capabilities based on the uplink configuration. In some aspects, the UE 104 may include an indication of whether it can operate with wideband PUCCH. For example, the UE can include a flag that denotes a binary indication (or true/false indication) of its wideband PUCCH capability. The UE 104 may include the flag within a logical channel identifier (LCID) field of a MAC subheader excluding content. In some aspects, the LCID MAC subheader may include a 6-bit field that can carry up to 64 values. The flag may be provided by at least one of the values. In this regard, one of the LCID MAC subheader values can indicate the wideband PUCCH capability. In some aspects, if a corresponding MAC subheader is not present in the PUCCH signal (e.g., RACH Message B), then the UE 104 may provide the wideband PUCCH capability flag using only legacy PUCCH signaling.

In other aspects, the UE 104 provides the LCD MAC subheader together with the MAC CE as payload to indicate a maximum number of resource blocks the UE 104 may occupy for PUCCH in formats 0/1 to maximize the transmission power. The MAC CE may include a content portion that carries the maximum RB number indication. In still other aspects, the UE 104 may directly indicate a specified number of RBs for its PUCCH formats 0/1 in the RACH Message A. The BS 102/180 may preconfigure a set of sizes for each PUCCH formats 0/1 (e.g., as described in connection with 704 of FIG. 7) for the UE 104 to select from. In this regard, the UE 104 may select among different default PUCCH resource tables. The UE 104 may select a default set of PUCCH resources based on the transmission power available (e.g., maximum transmission power of the UE 104) and the applicable PSD limitations of the UE 104. The BS 102/180 knows which default set of PUCCH resources the UE 104 intends to utilize after the BS 102/180 receives the RACH Message A, and the BS 102/180 grants by way of the RACH Message B with the PRI signaling pointing to the corresponding default set of PUCCH resources.

In other aspects, the UE 104 may include the indication of the UE's wideband PUCCH capability using an additional bit location in a MAC CE portion of the RACH Message A. In other aspects, the UE 104 may include the indication of the UE's wideband PUCCH capability by scrambling the RACH Message A with different DMRS scrambling sequences. For example, the RACH Message A may be scrambled with a first DMRS scrambling sequence to denote a first UE capability such as support for a first PUCCH bandwidth capability (e.g., single-RB PUCCH). In another example, the RACH Message A may be scrambled with a second DMRS scrambling sequence different than the first DMRS scrambling sequence to denote a second UE capability such as support for a second PUCCH bandwidth capability (e.g., multi-RB PUCCH).

In still other aspects, the UE 104 may include the indication of the UE's wideband PUCCH capability by scrambling the RACH Message A with different PUSCH payload scrambling sequences. For example, the RACH Message A may be scrambled with a first PUSCH payload scrambling sequence to denote a first UE capability such as support for a first PUCCH bandwidth capability (e.g., single-RB PUCCH). In another example, the RACH Message A may be scrambled with a second PUSCH payload scrambling sequence different than the first PUSCH payload scrambling sequence to denote a second UE capability such as support for a second PUCCH bandwidth capability (e.g., multi-RB PUCCH).

At 710, the BS 102/180 processes the received RACH Message A and transmits a random access response as a RACH Message B transmission to the UE 104. After the UE 104 indicates its capability of wideband PUCCH in the RACH Message A, the BS 102/180 may indicate the number of RBs for PUCCH that the UE 104 can utilize via the RACH Message B. For example, the RACH Message B may indicate which PUCCH resources to use (e.g., legacy single-RB PUCCH or multi-RB PUCCH). In some aspects, the RACH Message B may indicate a change in a default PUCCH resource table that contains entries with a different number of RBs, and the BS 102/180 may provide a selection through PRI signaling. In other aspects, the RACH Message B may contain information indicating which default set of PUCCH resources to utilize. In this regard, the RACH Message B may indicate a set of PUCCH resources that are preconfigured by specification or by system information signaling (e.g., SIB 1).

Figure 8:
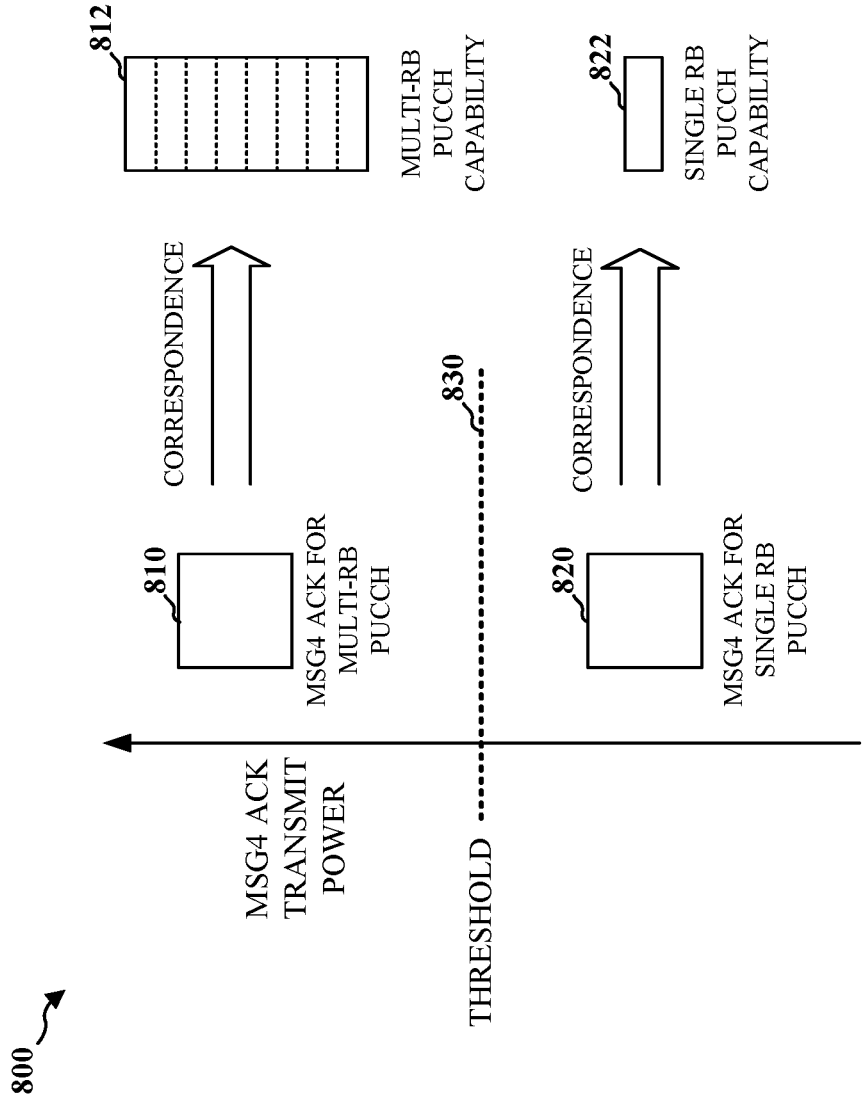
FIG. 8 illustrates a random access message acknowledgment transmission scheme, in accordance with some aspects of the present disclosure.

FIG. 8 illustrates an example of a random access transmission scheme 800, in accordance with some aspects of the present disclosure. The random access transmission scheme 800 may be employed by BSs such as the BSs 102, 180 and 310 and UEs such as the UEs 104 and 350. In the random access transmission scheme 800, a BS 102/180 may configure multiple sets of uplink resources in different frequency bands. For example, one set of uplink resources 810 may be located in a first frequency band and another set of uplink resources 820 may be located in a second frequency band. A UE 104 may autonomously select resources from the resources 810 in the first frequency band or from the resources 820 in the second frequency band for transmitting a random access signal.

The random access transmission scheme 800 enables the UE 104 to indicate its PUCCH bandwidth capability by selecting between a single RB and multiple RBs to improve bandwidth capacity when using contiguous frequencies for PUCCH. The subject technology provides for having different PUCCH resources for UEs supporting either a multi-RB PUCCH 812 or a single RB PUCCH 822. For example, occupying one PUCCH resource, such as the single-RB resource, can indicate that the UE 104 does not support wideband dedicated PUCCH in formats 0/1. For example, occupying another PUCCH resource, such as the multi-RB resource, can indicate that the UE 104 does support wideband dedicated PUCCH in formats 0/1. In some aspects, the base station can configure two sets of default PUCCH resources. For example, the base station may configure multiple sets of default PUCCH resources with different number of resource blocks for multiple UEs using PUCCH resources of different bandwidth, and the base station may configure a switching point in terms of transmission power for the UE 104 to select between a first PUCCH resource corresponding to a single RB PUCCH (or first PUCCH bandwidth) and a second PUCCH resource corresponding to a multi-RB PUCCH (or second PUCCH bandwidth). In some aspects, the base station may send the UE 104 a RACH Message 4/Message B grant, where the base station can indicate a single PRI to identify a selected default set of PUCCH resources. The PRI may map to different PUCCH resources with different bandwidth.

In some implementations, the UE 104 utilizes an acknowledgment message to the RACH Message 4 to indicate such PUCCH bandwidth capability when a four-step RACH process is implemented. In other implementations, the UE 104 utilizes an acknowledgment message to the RACH Message B indicate such PUCCH bandwidth capability when a two-step RACH process is implemented. The UE 104 may utilize different common PUCCH resources to transmit the acknowledgment message. When the UE 104 is power-limited by PSD limitations and has an acknowledgment message to the RACH Message 4 with an intended transmit power that does not exceed a reference transmit power threshold 830, the UE 104 may select resources from the resources 820 having a correspondence to the single-RB PUCCH frequency structure. Conversely, when a UE has an acknowledgment message to the RACH Message 4 with an intended transmit power that exceeds the reference transmit power threshold 830, the UE may select resources from the resources 810 having a correspondence to the multi-RB PUCCH frequency structure. The base station may perform blind detection of different PUCCHs from different default sets that map to the same indicated PM.

In an implementation, the UE 104 may perform power ramping during a random access procedure. For example, upon receiving a RACH Message 4 as part of a four-step RACH procedure, the UE 104 may select a PUCCH resource 822 having the single-RB frequency structure for transmission of an acknowledgment message to the RACH message 4. When no random access Message 4 is received, the UE 104 may increase the transmit power for a subsequent RACH Message 4 acknowledgment transmission. When the transmit power reaches a maximum PSD level allowable in the frequency band, the UE 104 may switch to select an uplink resource from the resources 810 with correspondence to a PUCCH resource 812 having the multi-RB frequency structure for a subsequent RACH Message 4 acknowledgment transmission.

Depending in which uplink resource set the RACH Message 4 acknowledgment is detected, the BS 102/180 can determine which set of PUCCH resources the UE 104 may use for the BS 102/180 to monitor for a PUCCH signal. For example, the BS 102/180 may monitor for the PUCCH signal in PUCCH resources having the single-RB frequency structure when an uplink resource is selected from the resources 810. In another example, the BS 102/180 may monitor for the PUCCH signal in PUCCH resources having the multi-RB frequency structure when another resource is selected from the resources 820.

In some aspects, the UE 104 may receive a configuration indicating the uplink resources 810 and 820. In some implementations, the UE 104 receives the configuration semi-statically, such as via RRC signaling. In some aspects, the configuration may include one or more parameters of the reference transmit power threshold. The parameters may indicate a distance between the UE 104 and the BS 102/180 and a mapping between the distance and the reference transmit power threshold such that the UE 104 can determine the reference transmit power threshold value from the mapping.

Figure 9:
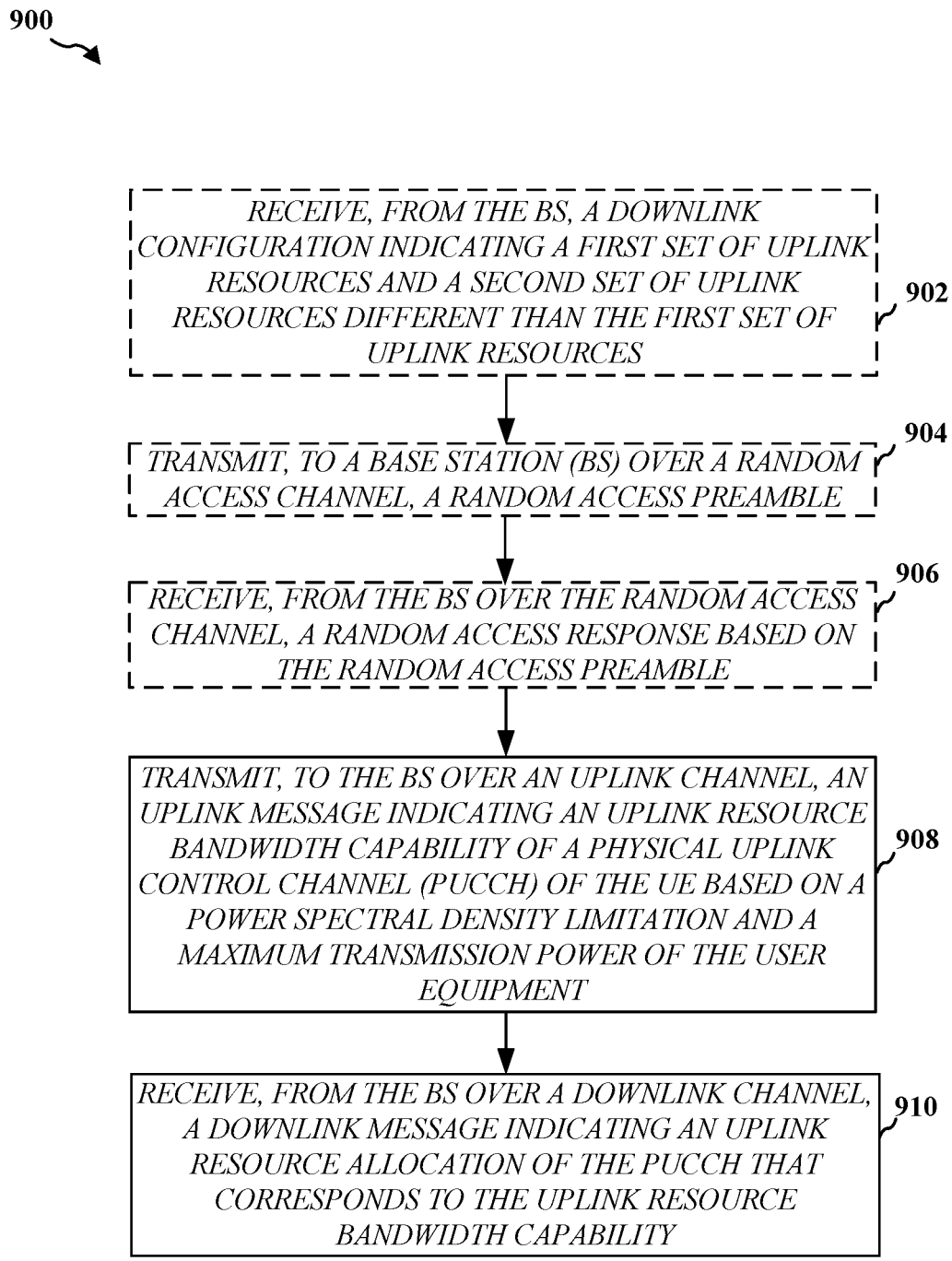
FIG. 9 is a flowchart of a process of wireless communication at a user equipment for wideband uplink control channel capability indication during initial access for wireless communication with power spectral density limitation, in accordance with some aspects of the present disclosure.

FIG. 9 is a flowchart of another process of wireless communication at a user equipment for wideband uplink control channel capability indication during initial access for wireless communication with power spectral density limitation, in accordance with some aspects of the present disclosure. The process 900 may be performed by a UE (e.g., the UE 104; UE 350). As illustrated, the process 900 includes a number of enumerated steps, but implementations of the process 900 may include additional steps before, after, and in between the enumerated steps. In some implementations, one or more of the enumerated steps may be omitted or performed in a different order.

As described above, to meet the PSD limitation, a UE may only be able to transmit up to a certain maximum power depending on the signal bandwidth. One approach to meeting the PSD limitation of a frequency spectrum and allowing a wireless communication device to transmit in the frequency spectrum at a full transmit power is to spread the frequency occupancy of a transmission signal over a wider bandwidth. In this regard, the UE can provide an uplink resource bandwidth capability that denotes whether the UE can support a wideband PUCCH.

At 902, the UE may receive, from the BS, a downlink configuration indicating a first set of uplink resources (e.g., set of single-RB resources) and a second set of uplink resources different than the first set of uplink resources (e.g., set of multi-RB resources) for a PUCCH. In other implementations, the first set of uplink resources and the second set of uplink resources are included in one or more entries of an uplink resource table that is hardcoded in the UE. In some aspects, the UE may receive, from the BS over the downlink channel, a RRC message that includes a downlink configuration having an indication of a specified number of resource blocks allocated for an uplink message, e.g., as described in connection with block 908.

At 904, the UE may transmit, to the BS over a random access channel, a random access preamble. In some aspects, the random access preamble corresponds to a random access channel (RACH) message 1 of a four-step RACH process. In other aspects, the random access preamble corresponds to at least a portion of a RACH message A of a two-step RACH process. In some implementations, the UE may transmit the random access preamble with a specified preamble length that indicates the uplink resource bandwidth capability of the PUCCH of the UE. For example, the uplink resource bandwidth capability may indicate that the UE operates with a first uplink resource bandwidth when the random access preamble is of a first preamble length. In another example, the uplink resource bandwidth capability may indicate that the UE operates with a second uplink resource bandwidth different than the first uplink resource bandwidth when the random access preamble is of a second preamble length different than the first preamble length.

At 906, the UE may receive, from the BS over the random access channel, a random access response based on the random access preamble. In some aspects, the random access response corresponds to a RACH message 2 of the four-step RACH process. In some aspects, the UE may obtain one or more measurements of the random access response. The UE may determine a carrier-to-interference-plus-noise ratio (CINR) based on the one or more measurements of the random access response and a transmit power of the random access preamble. The UE may determine a downlink pathloss measurement of the random access response from the one or more measurements of the random access response. The UE may select a specified number of resource blocks that corresponds to the CINR from a selected set of uplink resources based on the downlink pathloss measurement and the PSD limitation of the UE. In some aspects, the uplink resource bandwidth capability indicates the specified number of resource blocks for a physical uplink control channel.

At 908, the UE may transmit, to a base station over an uplink channel, an uplink message indicating an uplink resource bandwidth capability of a PUCCH of the UE based on a PSD limitation and a maximum transmission power of the UE. In some aspects, the uplink message corresponds to a RACH message 3 of the four-step RACH process. In other aspects, the uplink message corresponds to at least a portion of the RACH message A of the two-step RACH process, e.g., as described in connection with block 904. In some aspects, the RACH message A may include a PRACH preamble and a PUSCH. In some aspects, the PRACH includes the random access preamble, e.g., as described in connection with block 904, and the PUSCH includes the uplink message. In this regard, the PUSCH of the RACH message A may include the uplink resource bandwidth capability.

In some aspects, the uplink resource bandwidth capability indicates whether the UE operates with a first uplink resource bandwidth or a second uplink resource bandwidth different than the first uplink resource bandwidth. For example, the first uplink resource bandwidth may correspond to a single RB bandwidth and the second uplink resource bandwidth may correspond to a multi-RB bandwidth (or wider bandwidth).

In some aspects, the uplink message includes a MAC protocol data unit (PDU). The MAC PDU may include a MAC subheader that excludes content. For example, the MAC subheader may include a logical channel identifier (LCID) field. The LCID field may include the uplink resource bandwidth capability. For example, the LCID field includes a flag indicating the uplink resource bandwidth capability based on a selection between the first uplink resource bandwidth and the second uplink resource bandwidth. In some aspects, the flag is included in at least a portion of the LCID field. For example, the flag may be a single bit flag. In another example, the flag may be a multi-bit flag.

In some aspects, the MAC PDU includes a content portion. In particular, the MAC CE of the MAC PDU may include the content portion. In this regard, the uplink resource bandwidth capability may be included in the content portion of the MAC subheader. For example, the uplink resource bandwidth capability may indicate a maximum number of resource blocks for a physical uplink control channel based on the PSD limitation and a maximum transmit power of the UE.

In some aspects, the uplink message indicates the uplink resource bandwidth capability with a different DMRS scrambling sequence for each of the first uplink resource bandwidth and the second uplink resource bandwidth. For example, the uplink message may be scrambled with a first DMRS scrambling sequence that corresponds to the first uplink resource bandwidth such that presence of the first DMRS scrambling sequence indicates a first uplink resource bandwidth capability (e.g., capability to support a single-RB PUCCH). In another example, the uplink message may be scrambled with a second DMRS scrambling sequence (different than the first DMRS scrambling sequence) that corresponds to the second uplink resource bandwidth such that presence of the second DMRS scrambling sequence indicates a second uplink resource bandwidth capability (e.g., capability to support a multi-RB PUCCH).

In some aspects, the uplink message indicates the uplink resource bandwidth capability with a different physical uplink shared channel (PUSCH) payload scrambling sequence for each of the first uplink resource bandwidth and the second uplink resource bandwidth. For example, the uplink message may be scrambled with a first PUSCH payload scrambling sequence that corresponds to the first uplink resource bandwidth such that presence of the first PUSCH payload scrambling sequence indicates a first uplink resource bandwidth capability (e.g., capability to support a single-RB PUCCH). In another example, the uplink message may be scrambled with a second PUSCH payload scrambling sequence (different than the first PUSCH payload scrambling sequence) that corresponds to the second uplink resource bandwidth such that presence of the second PUSCH payload scrambling sequence indicates a second uplink resource bandwidth capability (e.g., capability to support a multi-RB PUCCH).

At 910, the UE may receive, from the BS over a downlink channel, a downlink message indicating an uplink resource allocation of the PUCCH that corresponds to the uplink resource bandwidth capability. In some aspects, the downlink message corresponds to a RACH message 4 of the four-step RACH process. In other aspects, the downlink message corresponds to at least a portion of a RACH message B of the two-step RACH process. In some aspects, the uplink resource allocation in the downlink message includes a PUCCH resource indicator (PRI) that indicates a selection between the first set of uplink resources and the second set of uplink resources, e.g., as described in connection with block 902.

Figure 10:
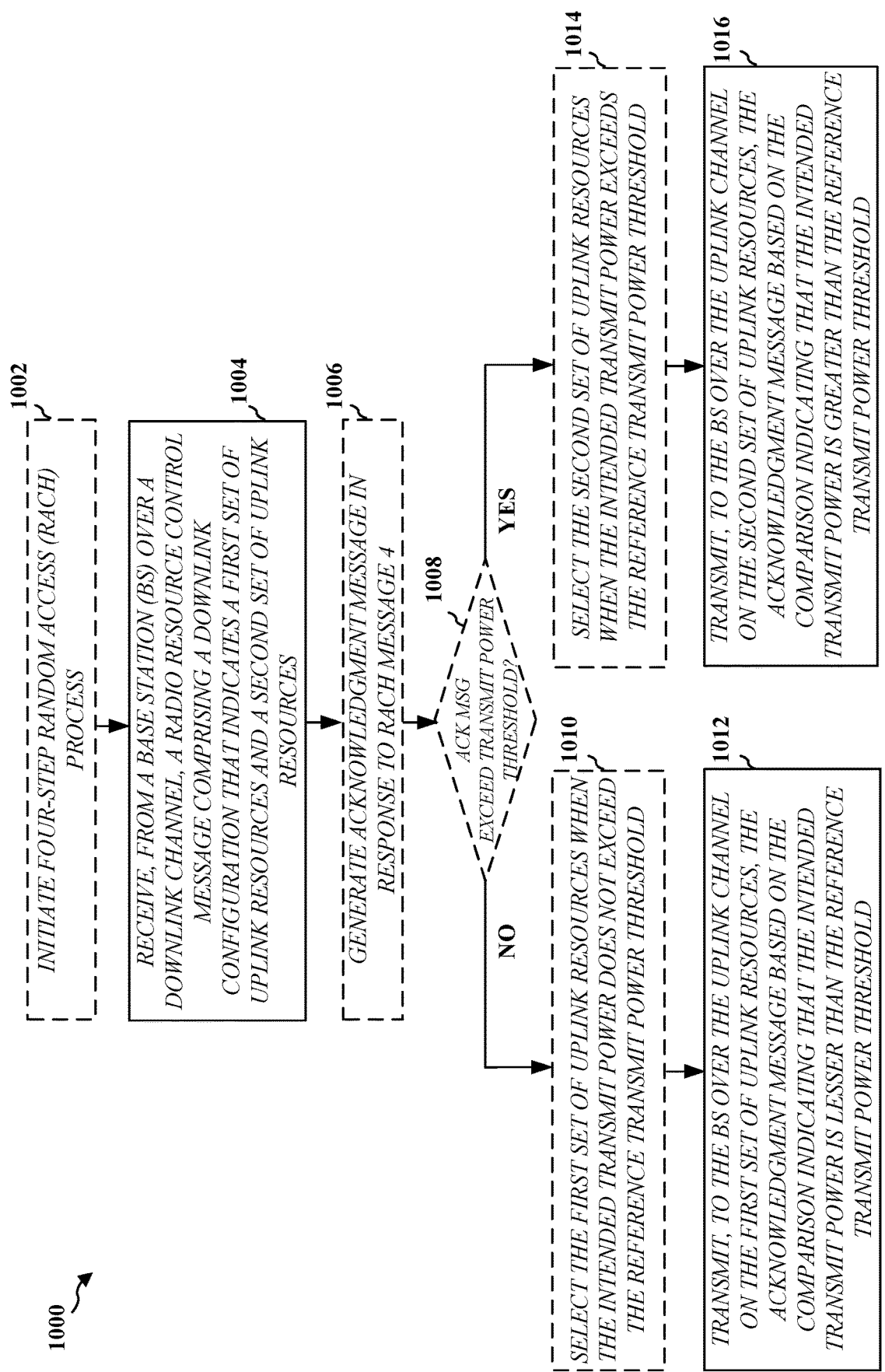
FIG. 10 is a flowchart of another process of wireless communication at a user equipment for wideband uplink control channel capability indication during initial access for wireless communication with power spectral density limitation, in accordance with some aspects of the present disclosure.

FIG. 10 is a flowchart of a process 1000 of wireless communication for multiplexing of overlapped uplink channel transmission repetitions at a user equipment, in accordance with some aspects of the present disclosure. The process 1000 may be performed by a UE (e.g., the UE 104; UE 350). As illustrated, the process 1000 includes a number of enumerated steps, but implementations of the process 1000 may include additional steps before, after, and in between the enumerated steps. In some implementations, one or more of the enumerated steps may be omitted or performed in a different order.

At 1002, the UE may initiate a four-step RACH process, where the UE 104 exchanges messages with the base station 102 to gain access to a wireless network and establish a communication connection, e.g., as described in connection with FIG. 6. The messages of the four-step RACH procedure may be referred to as RACH messages 1 to 4.

At 1004, the UE may receive, from a BS (e.g., BS 102/180) over a downlink channel, a RRC message that includes a downlink configuration that indicates a first set of uplink resources (e.g., set of single-RB resources) and a second set of uplink resources (e.g., set of multi-RB resources) of a PUCCH. In some aspects, the first set of uplink resources includes a first number of uplink resources and the second set of uplink resources includes a second number of uplink resources greater than the first number of uplink resources. For example, the first number of uplink resources corresponds to a single resource block allocated for a subsequent uplink control message on PUCCH (e.g., PUCCH forma 0/1) and the second set of uplink resources corresponds to a plurality of contiguous resource blocks allocated for a subsequent uplink control message. In some aspects, the uplink control message is communicated on a subband that includes a plurality of PUCCHs. In this regard, the UE may transmit the uplink control message in a selected PUCCH of the plurality of PUCCHs. In some aspects, the selected PUCCH has a first format corresponding to PUCCH format 0 or a second format corresponding to PUCCH format 1. The UE can receive the configuration, e.g., as described in connection with FIGS. 1, 6 and 8.

At 1006, the UE may generate an acknowledgment message in response to a downlink message of a RACH process (e.g., the RACH message 4). The acknowledgment message may indicate an uplink resource bandwidth capability of the PUCCH of the UE and may further indicate a selection between the first set of uplink resources and the second set of uplink resources based on a power spectral density limitation of the UE. In some aspects, the UE may transmit, to the BS on a first set of uplink resources or a second set of uplink resources, the acknowledgment message based on a comparison between an intended transmit power of the acknowledgment message and a reference transmit power threshold, e.g., as described in connection with block 1008. In this regard, the time/frequency resources used to transmit the acknowledgment message may correspond to the selection of the first and second sets of uplink resources and the transmission on such time/frequency resources may indicate the selection.

At 1008, the UE may determine whether an intended transmit power of the acknowledgment message exceeds a reference transmit power threshold based on a comparison between the intended transmit power of the acknowledgment message and the reference transmit power threshold. The UE can perform the comparison, e.g., as described in connection with FIG. 8. If the process 1000 determines that the transmit power required to transmit the acknowledgment message does not exceed the reference transmit power threshold, then the process 1000 proceeds to block 1010. Otherwise, the process 1000 proceeds to block 1014 when the process 1000 determines that the transmit power required to transmit the acknowledgment message exceeds the reference transmit power threshold.

In some aspects, the downlink configuration includes one or more parameters of the reference transmit power threshold. In some aspects, the one or more parameters indicate a distance between the UE and the BS and a mapping between the distance and the reference transmit power threshold. In this regard, the UE may determine the reference transmit power threshold based on the mapping.

At 1010, the UE may select a first set of uplink resources when the intended transmit power of the acknowledgment message does not exceed the reference transmit power threshold. The UE can select the first set of uplink resources for notifying the network of its non-wideband PUCCH capability, e.g., as described in connection with FIGS. 1 and 8.

At 1012, the UE may communicate, with the BS over an uplink channel on the first set of uplink resources, the acknowledgment message for providing feedback in response to the RACH message 4. For example, the UE may transmit the acknowledgment message on a single-RB resource to denote that the UE may not support wideband PUCCH. The UE can communicate the acknowledgment message, e.g., as described in connection with FIGS. 1 and 8.

At 1014, the UE may select a second set of uplink resources when the intended transmit power of the acknowledgment message exceeds the reference transmit power threshold. The UE can select the second set of uplink resources for notifying the network of its wideband PUCCH capability, e.g., as described in connection with FIGS. 1 and 8.

At 1016, the UE may communicate, with the BS over an uplink channel on the second set of uplink resources, the acknowledgment message for providing feedback in response to the RACH message 4. In some aspects, the UE may transmit the acknowledgment message on a multi-RB resource to denote that the UE supports wideband PUCCH. For example, the UE can transmit the acknowledgment message spanning across the plurality of contiguous resource blocks. The UE can communicate the acknowledgment message, e.g., as described in connection with FIGS. 1 and 8.

Figure 11:
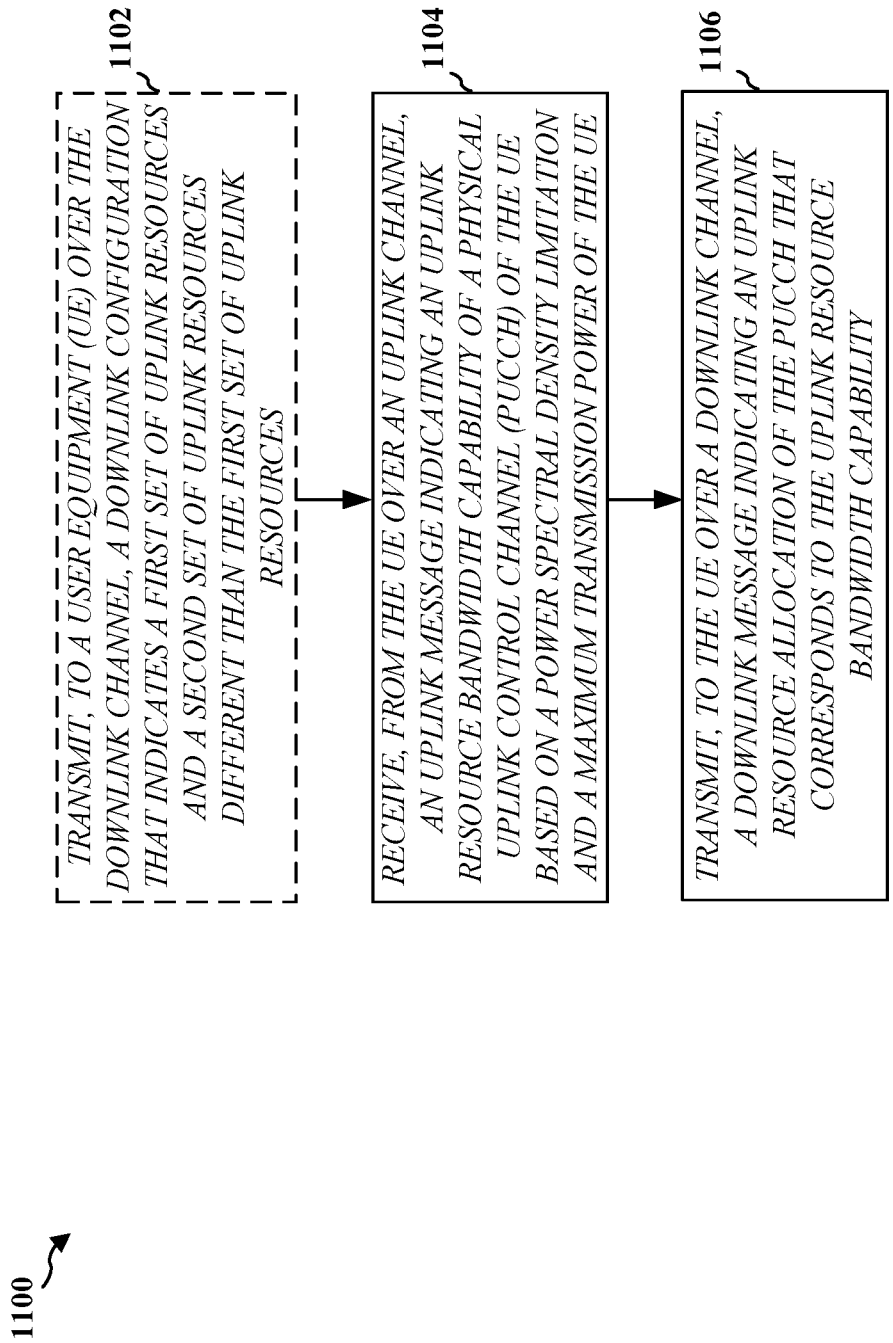
FIG. 11 is a flowchart of a process of wireless communication at a base station for wideband uplink control channel capability indication during initial access for wireless communication with power spectral density limitation, in accordance with some aspects of the present disclosure.

FIG. 11 is a flowchart of a process 1100 of wireless communication for multiplexing of overlapped uplink channel transmission repetitions at a base station, in accordance with some aspects of the present disclosure. The process 1100 may be performed by a BS (e.g., the BS 102, 180; base station 310). As illustrated, the process 1100 includes a number of enumerated steps, but implementations of the process 1100 may include additional steps before, after, and in between the enumerated steps. In some implementations, one or more of the enumerated steps may be omitted or performed in a different order.

At 1102, the BS transmits, to the UE over a downlink channel, a downlink configuration that indicates a first set of uplink resources and a second set of uplink resources different than the first set of uplink resources of a PUCCH. In some aspects, the BS may communicate, with the UE over a downlink channel, a RRC message comprising a downlink configuration that indicates a specified number of resource blocks allocated for an uplink message. The BS can communicate the downlink configuration, e.g., as described in connection with FIGS. 1 and 5-7.

At 1104, the BS may receive, from the UE over an uplink channel, an uplink message indicating an uplink resource bandwidth capability of the PUCCH of the UE based on a PSD limitation and a maximum transmission power of the UE. The BS can receive the uplink message, e.g., as described in connection with FIGS. 1 and 5-7.

In one or more implementations, the BS may receive, from the UE over a random access channel, a random access preamble with a specified preamble length that indicates the uplink resource bandwidth capability of the PUCCH of the UE. In some aspects, the uplink resource bandwidth capability indicates that the UE operates with a first uplink resource bandwidth (e.g., UE supports single-RB resource PUCCH) when the random access preamble is of a first preamble length. In some aspects, the uplink resource bandwidth capability indicates that the UE operates with a second uplink resource bandwidth different than the first uplink resource bandwidth (e.g., UE supports multi-RB resource PUCCH) when the random access preamble is of a second preamble length different than the first preamble length.

At 1106, the BS may transmit, to the UE over a downlink channel, a downlink message indicating an uplink resource allocation of the PUCCH that corresponds to the uplink resource bandwidth capability, e.g., as described in connection with FIGS. 1 and 5-7. In some aspects, the uplink resource allocation in the downlink message includes a PRI that indicates a selection between the first set of uplink resources and the second set of uplink resources.

Figure 12:
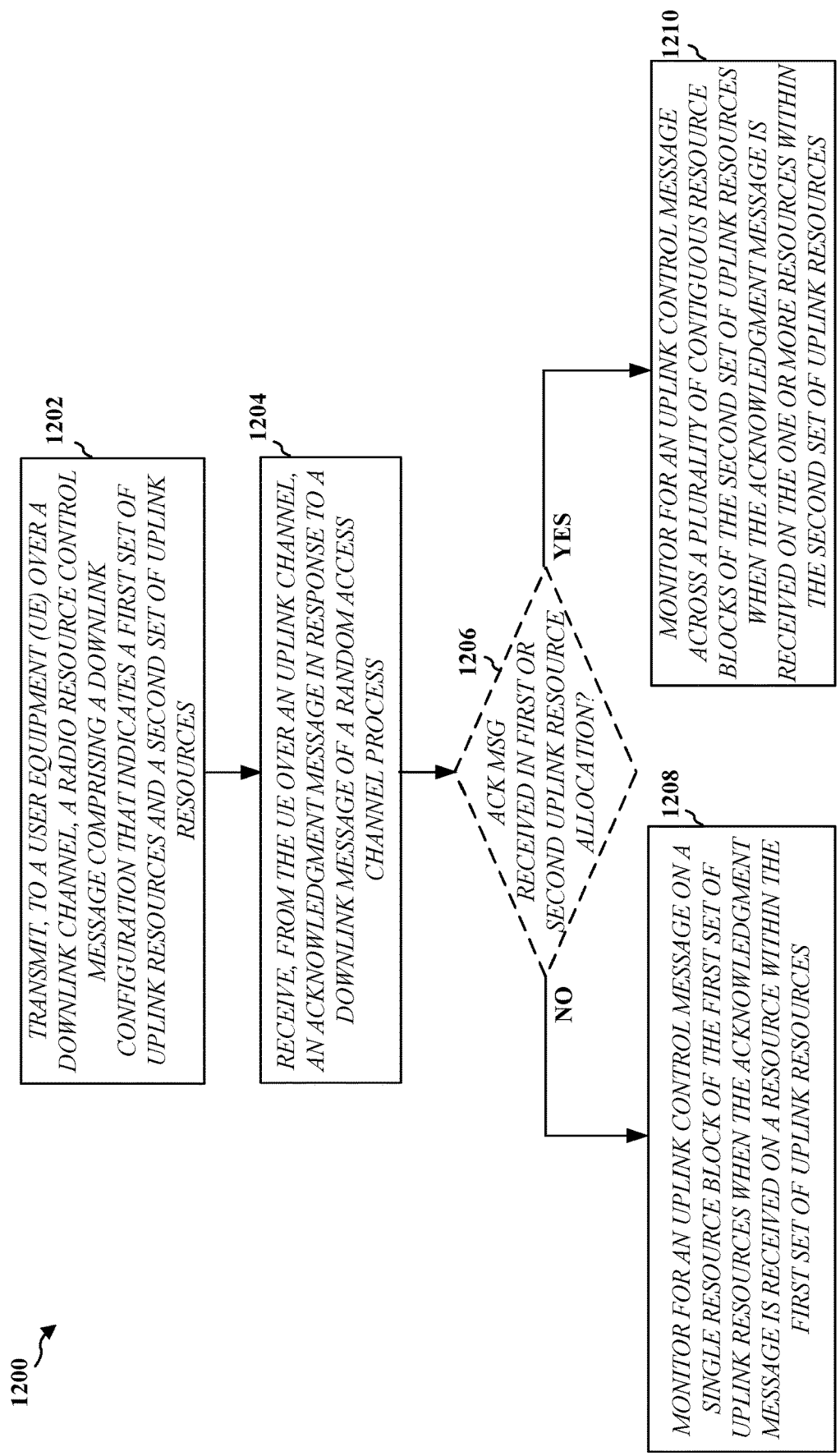
FIG. 12 is a flowchart of another process of wireless communication at a base station for wideband uplink control channel capability indication during initial access for wireless communication with power spectral density limitation, in accordance with some aspects of the present disclosure.

FIG. 12 is a flowchart of a process 1200 of wireless communication for multiplexing of overlapped uplink channel transmission repetitions at a base station, in accordance with some aspects of the present disclosure. The process 1200 may be performed by a BS (e.g., the BS 102, 180; base station 310). As illustrated, the process 1200 includes a number of enumerated steps, but implementations of the process 1200 may include additional steps before, after, and in between the enumerated steps. In some implementations, one or more of the enumerated steps may be omitted or performed in a different order.

At 1202, the BS may communicate, with the UE over a downlink channel, a RRC message that includes a downlink configuration indicating a first set of uplink resources and a second set of uplink resources of a PUCCH. The BS can communicate the first configuration, e.g., as described in connection with FIGS. 1 and 5-10.

At 1204, the BS may receive, from a UE over an uplink channel, an acknowledgment message that is in response to a RACH message 4, e.g., as described in connection with FIG. 6. In some aspects, the acknowledgment message may indicate an uplink resource bandwidth capability of the PUCCH of the UE and may further indicate a selection between the first set of uplink resources and the second set of uplink resources based on a power spectral density limitation and a maximum transmission power of the UE. The BS can receive the acknowledgment message, e.g., as described in connection with FIGS. 1, 5 and 6.

At 1206, the BS may determine whether the acknowledgment message is received on one or more resources within the first set of uplink resources or a second set of uplink resources. In this regard, the BS may be notified that the UE can support non-wideband PUCCH when the acknowledgment message is received on the first set of uplink resources, or that the UE can support wideband PUCCH when the acknowledgment message is received on the second set of uplink resources. The BS can perform the monitoring, e.g., as described in connection with FIGS. 1, 5 and 6.

At 1208, the BS may monitor for an uplink control message within a resource block of the first set of uplink resources when the acknowledgment message is received on a resource within the first set of uplink resources. The BS can monitor for the uplink control message within the first set of uplink resources, e.g., as described in connection with FIGS. 5-7.

At 1210, the BS may monitor for an uplink control message within a resource block of the second set of uplink resources when the acknowledgment message is received on a resource within the second set of uplink resources. The BS can monitor for the uplink control message within the second set of uplink resources, e.g., as described in connection with FIGS. 5-7.

Figure 13:
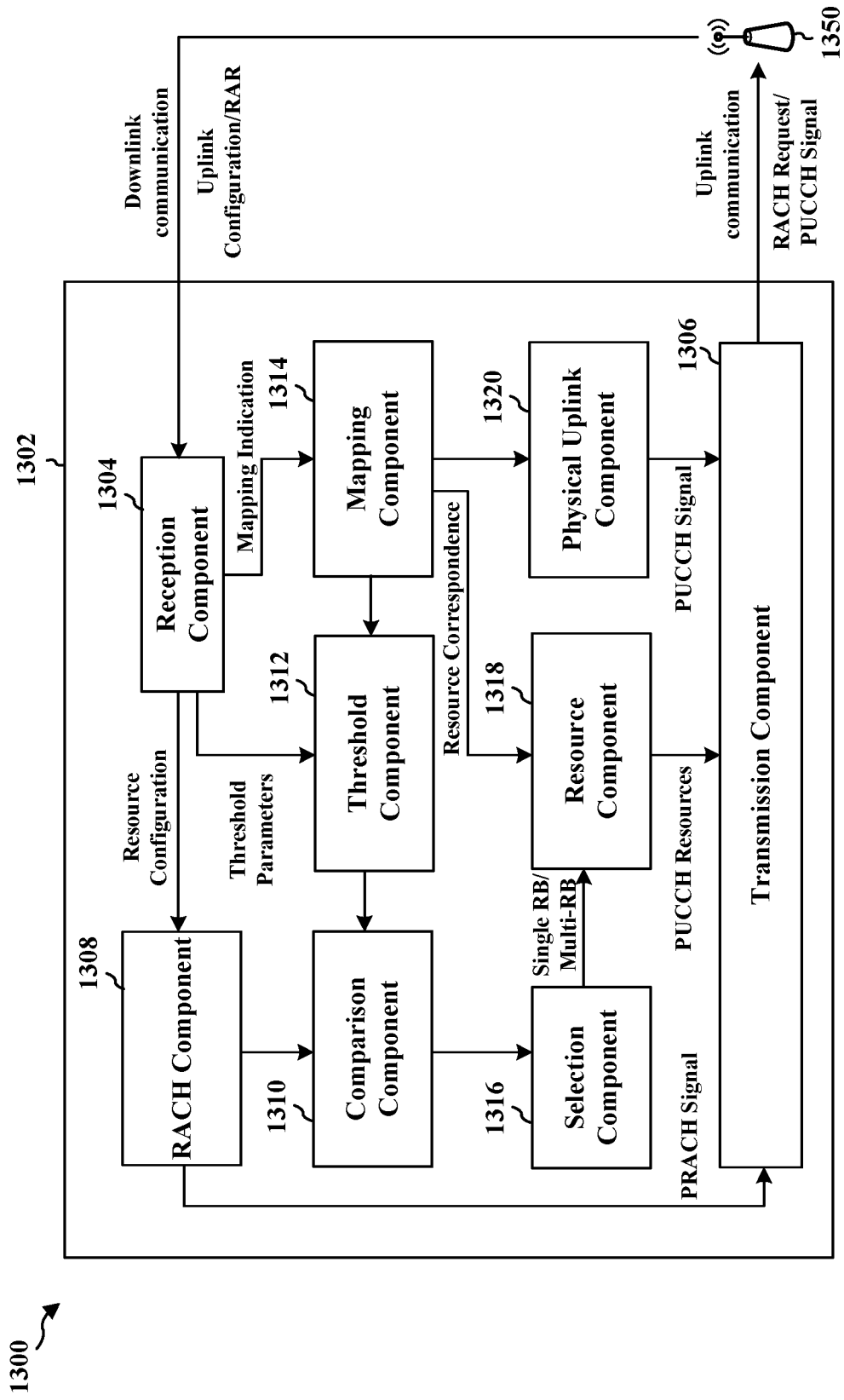
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a UE (e.g., UE 104, 350, 1302, 1302') in wireless communication with base station 1350.

The apparatus includes a reception component 1304 that receives downlink communication from the base station 1350. The reception component 1304 may be configured to receive signals and/or other information from other devices including, e.g., base station 1350. The signals/information received by the reception component 1304 may be provided to one or more components of the apparatus 1302 for further processing and use in performing various operations in accordance with the methods discussed supra including the processes of the aforementioned flowchart (e.g., process 900). Thus, via the reception component 1304, the apparatus 1302 and/or one or more components therein receive signals and/or other information (e.g., such as downlink data for the apparatus 1302 and/or other control signaling) from the base station 1350 as discussed supra and also discussed more specifically infra. In one or more implementations, the reception component 1304 may be implemented, for example, in the RX processor 356 with reference to FIG. 3.

In some aspects, the reception component 1304 is configured to receive, from the BS, a downlink configuration indicating a first set of uplink resources (e.g., set of single-RB resources) and a second set of uplink resources different than the first set of uplink resources (e.g., set of multi-RB resources), e.g., as described in connection with block 902 of FIG. 9. In some aspects, the reception component 1304 can receive, from the BS over a downlink channel, a random access response based on the random access preamble, e.g., as described in connection with block 906 of FIG. 9. In some aspects, the reception component 1304 can receive, from the BS over a downlink channel, a downlink message indicating an uplink resource allocation that corresponds to the uplink resource bandwidth capability, e.g., as described in connection with block 910 of FIG. 9. In other aspects, the reception component 1304 can receive, from the BS over the downlink channel, a RRC message comprising a downlink configuration that indicates a specified number of resource blocks allocated for an uplink message.

The apparatus includes a RACH component 1308 configured to perform a four-step RACH process for requesting initial access to a network (e.g., RACH Messages 1-4). In other aspects, the RACH component 1308 may be configured to perform a two-step RACH process (e.g., RACH Message A, RACH Message B). In some aspects, the RACH component 1308 generates a random access preamble (or RACH message 1 in the four-step RACH process, RACH message A in the two-step RACH process). In other aspects, the RACH component 1308 may generate the random access preamble with a specified preamble length. For example, the RACH component 1308 generates the random access preamble with a first length that may be used to notify the network of the UE's non-wideband PUCCH capability (e.g., single-RB resource capability). In another example, the RACH component 1308 generates the random access preamble with a second preamble length different than the first preamble length that may be used to notify the network of the UE's wideband PUCCH capability (e.g., multi-RB resource capability). In some aspects, the RACH component 1308 provides the random access preamble to the transmission component 1306 for transmission. The RACH component 1308 may receive, from the BS over the downlink channel, a random access response (or RACH message 2 in the four-step RACH process, RACH message B in the two-step RACH process) based on the random access preamble. In some aspects, the RACH message A includes a PRACH and a PUSCH, in which the PRACH may include the random access preamble and the PUSCH includes the uplink message. In this regard, the PUSCH of the RACH message A can include the uplink resource bandwidth capability. In some aspects, the RACH component 1308 can generate a RACH message 4 acknowledgment message in response to the RACH message 4. In some aspects, the RACH message 4 may include a downlink configuration that indicates the first set of uplink resources and the second set of uplink resources, such that the acknowledgment message is generate in response to the RACH message 4. In some aspects, the acknowledgment message includes the uplink resource bandwidth capability of the PUCCH of the UE that indicates a selection between the first set of uplink resources and the second set of uplink resources based on the PSD limitation of the UE. In one or more implementations, the RACH component 1308 may be implemented, for example, in any combination of the RX processor 356, the TX processor 368, and/or the controller/processor 359 with reference to FIG. 3.

The apparatus includes a comparison component 1310 configured to determine whether an intended transmit power of an acknowledgment message exceeds a reference transmit power threshold based on a comparison between an intended transmit power of the acknowledgment message and the reference transmit power threshold, e.g., as described in connection with block 1008 of FIG. 10. In one or more implementations, the comparison component 1310 may be implemented, for example, in any combination of the RX processor 356, the TX processor 368, and/or the controller/ processor 359 with reference to FIG. 3.

The apparatus includes a threshold component 1312 configured to determine the reference transmit power threshold based on a mapping between a distance and the reference transmit power threshold. In some aspects, the RACH configuration includes one or more parameters of the reference transmit power threshold. In some aspects, the one or more parameters indicate a distance between the UE and the BS and the mapping. In one or more implementations, the threshold component 1312 may be implemented, for example, in any combination of the RX processor 356, the TX processor 368, and/or the controller/processor 359 with reference to FIG. 3.

The apparatus includes a mapping component 1314 configured to receive the one or more parameters that indicate a distance between the UE and the BS and indicate the mapping between the distance and the reference transmit power threshold. In this regard, the mapping component 1314, in coordination with the threshold component 1312, may determine the reference transmit power threshold based on the mapping. In one or more implementations, the mapping component 1314 may be implemented, for example, in any combination of the RX processor 356, the TX processor 368, and/or the controller/processor 359 with reference to FIG. 3.

The apparatus includes a selection component 1316 configured to select a first set of uplink resources when the intended transmit power does not exceed the reference transmit power threshold, e.g., as described in connection with block 1010 of FIG. 10. In some aspects, the selection component 1316 can select a second set of uplink resources when the intended transmit power exceeds the reference transmit power threshold, e.g., as described in connection with block 1014 of FIG. 10. In this regard, the selection component 1316 may provide a selection control signal to the resource component 1318. In some aspects, the selection component 1316 is also configured to select between a first set of uplink resources and a second set of uplink resources based on which uplink resources the acknowledgment message was transmitted. In this regard, the selection component 1316 may provide a second selection control signal to the resource component 1318. In one or more implementations, the selection component 1316 may be implemented, for example, in any combination of the RX processor 356, the TX processor 368, and/or the controller/processor 359 with reference to FIG. 3.

The apparatus includes a resource component 1318 configured to obtain the uplink resource allocation in the downlink message, which includes PRI that indicates a selection between the first set of uplink resources and the second set of uplink resources. In some aspects, the resource component 1318 has access to the first set of uplink resources and the second set of uplink resources, where both sets are included in one or more entries of an uplink resource table that is hardcoded in the UE. In other aspects, the resource component 1318 can receive, through coordination with the reception component 1304, from the BS, a downlink configuration indicating the first set of uplink resources and the second set of uplink resources.

In some aspects, the resource component 1318 can obtain one or more measurements of the random access response and determine a carrier-to-interference-plus-noise ratio based on the one or more measurements of the random access response and a transmit power of the random access preamble. The resource component 1318 can determine a downlink pathloss measurement of the random access response from the one or more measurements of the random access response. The resource component 1318, through coordination with the selection component 1316, may select a specified number of resource blocks that corresponds to the CINR from a selected set of uplink resources based on the downlink pathloss measurement and the PSD limitation of the UE. In this regard, the resource component 1318 can indicate the specified number of resource blocks for PUCCH within the uplink resource bandwidth capability signaling. In some aspects, the resource component 1318 may determine a maximum number of resource blocks for a physical uplink control channel based on the PSD limitation and a maximum transmit power of the UE. The resource component 1318 may receive a selection control signal from the selection component 1316 for selecting between the first and second sets of uplink resources.

The resource component 1318 may be configured to use a first set of uplink resources for transmission of the acknowledgment message when the intended transmit power does not exceed the reference transmit power threshold. The resource component 1318 is also configured to use a second set of uplink resources for transmission of the acknowledgment message when the intended transmit power exceeds the reference transmit power threshold. In some aspects, the resource component 1318 is configured to use a first set of uplink resources for transmission of a PUCCH signal when the first set of uplink resources are utilized for transmission of the acknowledgment message. In other aspects, the resource component 1318 is also configured to use a second set of uplink resources for transmission of a PUCCH signal when the second set of uplink resources are utilized for transmission of the acknowledgment message.

The resource component 1318 may receive a resource correspondence signal from the mapping component 1314 that indicates a mapping between the selected uplink resources and the PUCCH signal. In some aspects, the resource component 1318 provides the selected resources to the transmission component 1306 for facilitating transmission of the acknowledgment message and uplink control message. In one or more implementations, the resource component 1318 may be implemented, for example, in any combination of the RX processor 356, the TX processor 368, and/or the controller/processor 359 with reference to FIG. 3.

The apparatus includes a physical uplink component 1320 configured to generate an uplink control message (e.g., PUCCH) for transmission to the BS over an uplink channel on a first set of uplink resources that corresponds to a first uplink resource bandwidth capability. The physical uplink component 1320 may generate the uplink message to include a media access control (MAC) protocol data unit (PDU), in which the MAC PDU includes a MAC subheader having a logical channel identifier (LCID) field. The uplink message may include a flag indicating the uplink resource bandwidth capability based on a selection between the first uplink resource bandwidth and the second uplink resource bandwidth. In some aspects, the physical uplink component 1320 includes the flag in at least a portion of the LCID field. In some aspects, the physical uplink component 1320 may generate the uplink message to include the MAC PDU with a MAC CE, in which the uplink resource bandwidth capability may be included in at least a portion of the MAC CE. In some aspects, the physical uplink component 1320 may include the uplink resource bandwidth capability in a content portion of the MAC PDU. The physical uplink component 1320 may generate the uplink resource bandwidth capability indicates a maximum number of resource blocks for a physical uplink control channel based on the PSD limitation and a maximum transmit power of the UE.

In some aspects, the physical uplink component 1320 may generate the uplink message to indicate the uplink resource bandwidth capability with a different DMRS scrambling sequence for each of the first uplink resource bandwidth and the second uplink resource bandwidth. For example, the physical uplink component 1320 may scramble the uplink message with a first DMRS scrambling sequence to indicate the first uplink resource bandwidth by way of the DMRS scrambling sequence. In another example, the physical uplink component 1320 may scramble the uplink message with a second DMRS scrambling sequence to indicate the second uplink resource bandwidth by way of the DMRS scrambling sequence.

In some aspects, the physical uplink component 1320 may generate the uplink message to indicate the uplink resource bandwidth capability with a different PUSCH payload scrambling sequence for each of the first uplink resource bandwidth and the second uplink resource bandwidth. For example, the physical uplink component 1320 may scramble the uplink message with a first PUSCH payload scrambling sequence to indicate the first uplink resource bandwidth by way of the PUSCH payload scrambling sequence. In another example, the physical uplink component 1320 may scramble the uplink message with a second PUSCH payload scrambling sequence to indicate the second uplink resource bandwidth by way of the PUSCH payload scrambling sequence.

In some aspects, the physical uplink component 1320 provides the generated uplink control message to the transmission component 1306 for transmission. In one or more implementations, the physical uplink component 1320 may be implemented, for example, in any combination of the TX processor 368 and/or the controller/processor 359 with reference to FIG. 3.

The apparatus includes a transmission component 1306 that transmits uplink communication to the base station 1350. The transmission component 1306 may be configured to transmit various messages to one or more external devices, e.g., including the base station 1350, in accordance with the methods disclosed herein. The messages/signals to be transmitted may be generated by one or more other components as discussed above, or the messages/signals to be transmitted may be generated by the transmission component 1306 under the direction/control of the one or more other components discussed supra. Thus, in various configurations, via the transmission component 1306, the apparatus 1302 and/or one or more components therein transmit signals and/or other information (e.g., such as uplink data, control messages and/or other signals) to external devices such as the base station 1350. In some aspects, the transmission component 1306 is configured to transmit, to the BS over a random access channel, a random access preamble, e.g., as described in connection with block 904 of FIG. 9. In some aspects, the transmission component 1306 may transmit, to the BS over the random access channel, a random access preamble with a specified preamble length that indicates the uplink resource bandwidth capability of the PUCCH of the UE. In some aspects, the transmission component 1306 is configured to transmit, to a base station over an uplink channel, an uplink message indicating an uplink resource bandwidth capability of the PUCCH of the UE based on a power spectral density (PSD) limitation and a maximum transmission power of the UE, e.g., as described in connection with block 908 of FIG. 9.

In some aspects, the transmission component 1306 is configured to transmit, to the BS over an uplink channel, an acknowledgment message in response to a downlink message of a RACH process (e.g., RACH message 4). In other aspects, the transmission component 1306 may transmit, to the BS on a first set of uplink resources or a second set of uplink resources, the acknowledgment message based on a comparison between an intended transmit power of the acknowledgment message and a reference transmit power threshold. For example, the transmission component 1306 may transmit, to the BS over the uplink channel on the first set of uplink resources, the acknowledgment message based on the comparison indicating that the intended transmit power is lesser than the reference transmit power threshold, e.g., as described in connection with block 1012 of FIG. 10. For example, the transmission component 1306 may transmit, to the BS on the PUCCH within the single resource block, the acknowledgment message. In another example, the transmission component 1306 may transmit, to the BS over the uplink channel on the second set of uplink resources, the acknowledgment message based on the comparison indicating that the intended transmit power is greater than the reference transmit power threshold, e.g., as described in connection with block 1016 of FIG. 10. For example, the transmission component 1306 may transmit, to the BS on the PUCCH, the acknowledgment message spanning across the plurality of contiguous resource blocks. In one or more implementations, the transmission component 1306 may be implemented, for example, in the TX processor 368 with reference to FIG. 3.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
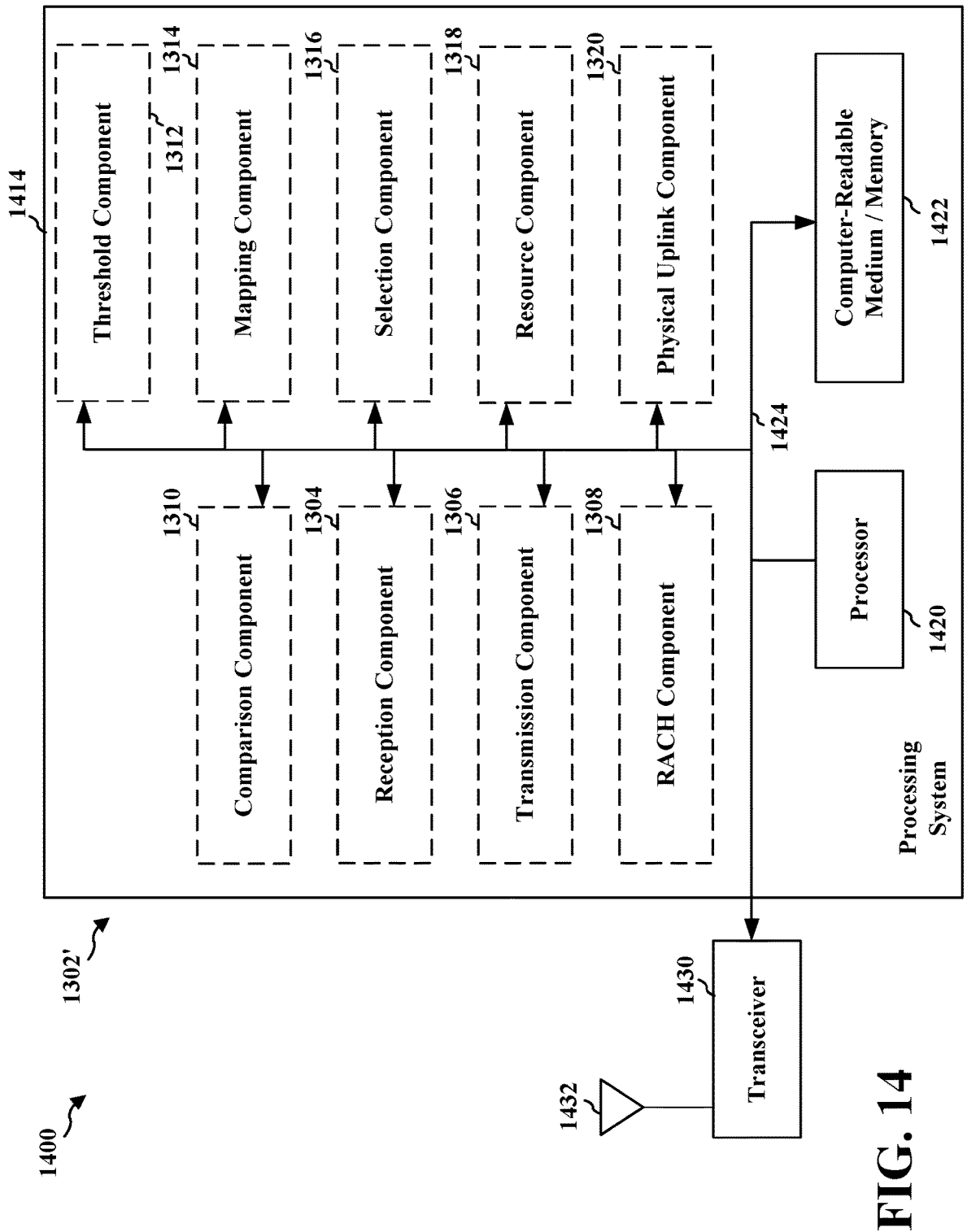
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1420, the components 1304, 1306, 1308, 1310, 1312, 1314, 1316, 1318, 1320, and the computer-readable medium/memory 1422. As such, all components linked by the bus 1424 are communicatively coupled with each other. The bus 1424 may also link various other circuits such as timing sources, peripherals, voltage regulators, and power management circuits, which are well known in the art, and therefore, will not be described any further.

The processing system 1414 may be coupled to a transceiver 1430. The transceiver 1430 is coupled to one or more antennas 1432. The transceiver 1430 provides a means for communicating with various other apparatus over a transmission medium. The transceiver 1430 receives a signal from the one or more antennas 1432, extracts information from the received signal, and provides the extracted information to the processing system 1414, specifically the reception component 1304. In addition, the transceiver 1430 receives information from the processing system 1414, specifically the transmission component 1306, and based on the received information, generates a signal to be applied to the one or more antennas 1432. The processing system 1414 includes a processor 1420 coupled to a computer-readable medium/memory 1422. The processor 1420 is responsible for general processing, including the execution of software stored on the computer-readable medium/memory 1422. The software, when executed by the processor 1420, causes the processing system 1414 to perform the various functions described supra for any particular apparatus. The computer-readable medium/memory 1422 may also be used for storing data that is manipulated by the processor 1420 when executing software. The processing system 1414 further includes at least one of the components 1304, 1306, 1308, 1310, 1312, 1314, 1316, 1318, 1320. The components may be software components running in the processor 1420, resident/stored in the computer readable medium/memory 1422, one or more hardware components coupled to the processor 1420, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication includes means for transmitting, to a base station over an uplink channel, an uplink message indicating an uplink resource bandwidth capability of a PUCCH of the UE based on a power spectral density limitation of the UE. The apparatus 1302/1302' also includes means for receiving, from the BS over a downlink channel, a downlink message indicating an uplink resource allocation that corresponds to the uplink resource bandwidth capability. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
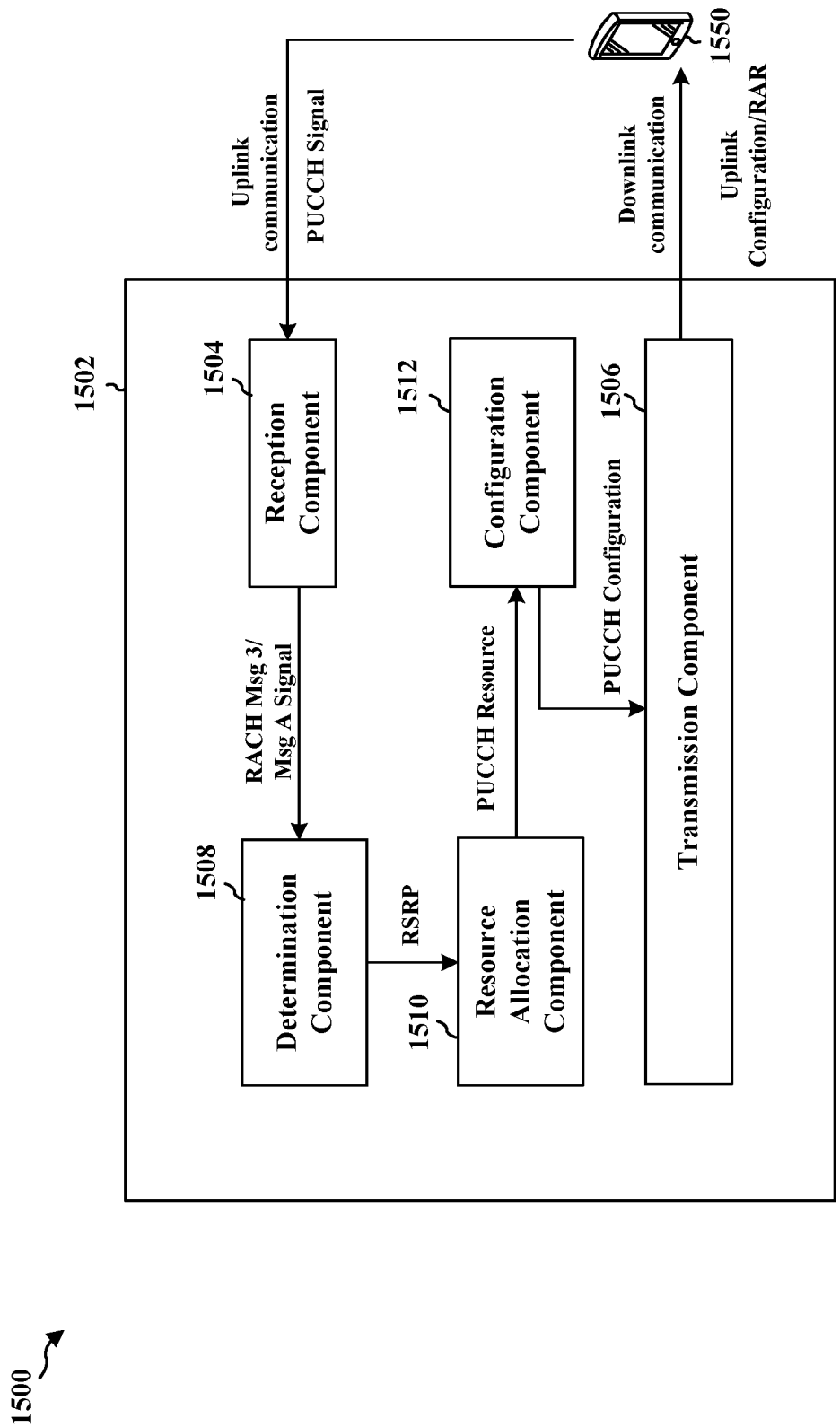
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus may be a base station (e.g., BS 102, 180, 310) in wireless communication with UE 1550.

The apparatus includes a reception component 1504 that receives uplink communication from the UE 1550. The reception component 1504 may be configured to receive signals and/or other information from other devices including, e.g., UE 1550. The signals/information received by the reception component 1504 may be provided to one or more components of the apparatus 1502 for further processing and use in performing various operations in accordance with the methods discussed supra including the processes of the aforementioned flowchart (e.g., process 1200). Thus, via the reception component 1504, the apparatus 1502 and/or one or more components therein receive signals and/or other information (e.g., such as uplink data for the apparatus 1502 and/or other control signaling) from the UE 1550 as discussed supra and also discussed more specifically infra. In some aspects, the reception component 1504 is configured to receive, from a UE over an uplink channel, an uplink message indicating an uplink resource bandwidth capability of a PUCCH of the UE based on a PSD limitation of the UE, e.g., as described in connection with block 1104 of FIG. 11. For example, the reception component 1504 may be configured to receive a RACH message 3 as part of a four-step RACH process. In another example, the reception component 1504 may receive a RACH message A as part of a two-step RACH process.

In some aspects, the reception component 1504 may be configured to receive, from the UE over an uplink channel, an acknowledgment message in response to the RACH message 4, e.g., as described in connection with block 1204 of FIG. 12. In some aspects, the acknowledgment message may indicate an uplink resource bandwidth capability of the PUCCH of the UE and may further indicate a selection between the first set of uplink resources and the second set of uplink resources based on a power spectral density limitation of the UE. For example, the reception component 1504 may receive, from the UE on a first set of uplink resources or a second set of uplink resources, the acknowledgment message.

The reception component 1504 may monitor for an uplink control message within a resource block of a first uplink resource allocation when the acknowledgment message is received on the one or more resources within the first uplink resource allocation, e.g., as described in connection with block 1110 of FIG. 11. In some aspects, the reception component 1504 may be configured to monitor for the uplink control message across a plurality of contiguous resource blocks of a second uplink resource allocation when the acknowledgment message is received on the one or more resources within the second uplink resource allocation, e.g., as described in connection with block 1112 of FIG. 11.

In some aspects, the reception component 1504 may receive, from the UE over a random access channel, a random access preamble. In some aspects, the reception component 1504 may receive, from the UE over a random access channel, a random access preamble with a specified preamble length that indicates the uplink resource bandwidth capability of the PUCCH of the UE. For example, the uplink resource bandwidth capability indicates that the UE operates with a first uplink resource bandwidth when the random access preamble is of a first preamble length. In another example, the uplink resource bandwidth capability indicates that the UE operates with a second uplink resource bandwidth different than the first uplink resource bandwidth when the random access preamble is of a second preamble length different than the first preamble length. In other aspects, the reception component 1504 may receive, from the UE over an uplink channel, an uplink message based on a random access response (or RACH message 2 of a two-step RACH process, RACH message B of a two-step RACH process). In one or more implementations, the reception component 1504 may be implemented, for example, in the RX processor 370 with reference to FIG. 3.

The apparatus includes a determination component 1508 configured to determine whether the acknowledgment message is received on one or more resources within a first uplink resource allocation or a second uplink resource allocation, e.g., as described in connection with block 1108 of FIG. 11. Based on an uplink pre-configuration to the UE 1550, the apparatus can monitor for the acknowledgment message on certain frequency bands. In one or more implementations, the determination component 1508 may be implemented, for example, in any combination of the RX processor 370, the TX processor 316, and/or the controller/processor 375 with reference to FIG. 3.

The apparatus includes a resource allocation component 1510 configured to determine a first uplink resource allocation and a second uplink resource allocation. In some aspects, the first uplink resource allocation may include first PUCCH resources that correspond to a single-RB PUCCH resource set. In some aspects, the second uplink resource allocation may include second PUCCH resources that correspond to a multi-RB PUCCH resource set. In some implementations, the resource allocation component 1510 is also configured to determine a first uplink resource allocation that includes the single-RB PUCCH resource and a second uplink resource allocation that includes the multi-RB PUCCH resource. In other aspects, the resource allocation component 1510, in coordination with the determination component 1508, may measure the received acknowledgment message to determine whether the PUCCH resources correspond to the first uplink resource allocation or the second uplink resource allocation, as described in reference to FIGS. 8 and 12. In one or more implementations, the resource allocation component 1510 may be implemented, for example, in any combination of the RX processor 370, the TX processor 316, and/or the controller/processor 375 with reference to FIG. 3.

The apparatus includes a configuration component 1512 configured to generate a downlink configuration indicating the first uplink resource allocation comprising one uplink resource block and the second uplink resource allocation comprising a plurality of contiguous resource blocks of a PUCCH. In some aspects, the configuration component 1512 generates a downlink configuration that indicates a specified number of resource blocks allocated for the uplink message. In one or more implementations, the configuration component 1512 may be implemented, for example, in any combination of the RX processor 370, the TX processor 316, and/or the controller/processor 375 with reference to FIG. 3.

The apparatus includes a transmission component 1506 that transmits, to the UE over a downlink channel, a downlink message indicating an uplink resource allocation that corresponds to the uplink resource bandwidth capability, e.g., as described in connection with block 1106 of FIG. 11. The transmission component 1506 may be configured to transmit various messages to one or more external devices, e.g., including the UE 1550, in accordance with the methods disclosed herein. The messages/signals to be transmitted may be generated by one or more other components as discussed above, or the messages/signals to be transmitted may be generated by the transmission component 1506 under the direction/control of the one or more other components discussed supra. Thus, in various configurations, via the transmission component 1506, the apparatus 1502 and/or one or more components therein transmit signals and/or other information (e.g., such as downlink data, control messages and/or other signals) to external devices such as the UE 1550. In some aspects, the transmission component 1506 is configured transmit, to the UE, a downlink configuration indicating a first set of uplink resources and a second set of uplink resources different than the first set of uplink resources, e.g., as described in connection with block 1102 of FIG. 11. In some aspects, the transmission component 1506 can transmit, to the UE over the downlink channel, a RRC message comprising a downlink configuration that indicates a specified number of resource blocks allocated for the uplink message. In one or more implementations, the transmission component 1506 may be implemented, for example, in the TX processor 316 with reference to FIG. 3.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1620, the components 1504, 1506, 1508, 1510, 1512, and the computer-readable medium/memory 1622. As such, all components linked by the bus 1424 are communicatively coupled with each other. The bus 1624 may also link various other circuits such as timing sources, peripherals, voltage regulators, and power management circuits, which are well known in the art, and therefore, will not be described any further.

The processing system 1614 may be coupled to a transceiver 1630. The transceiver 1630 is coupled to one or more antennas 1632. The transceiver 1630 provides a means for communicating with various other apparatus over a transmission medium. The transceiver 1630 receives a signal from the one or more antennas 1632, extracts information from the received signal, and provides the extracted information to the processing system 1614, specifically the reception component 1504. In addition, the transceiver 1630 receives information from the processing system 1614, specifically the transmission component 1506, and based on the received information, generates a signal to be applied to the one or more antennas 1632. The processing system 1614 includes a processor 1620 coupled to a computer-readable medium/memory 1622. The processor 1620 is responsible for general processing, including the execution of software stored on the computer-readable medium/memory 1622. The software, when executed by the processor 1620, causes the processing system 1614 to perform the various functions described supra for any particular apparatus. The computer-readable medium/memory 1622 may also be used for storing data that is manipulated by the processor 1620 when executing software. The processing system 1614 further includes at least one of the components 1504, 1506, 1508, 1510, 1512. The components may be software components running in the processor 1620, resident/stored in the computer readable medium/memory 1622, one or more hardware components coupled to the processor 1620, or some combination thereof. The processing system 1614 may be a component of the UE 350 and may include the memory 360 and/or at least one of the TX processor 368, the RX processor 356, and the controller/processor 359.

In one configuration, the apparatus 1502/1502' for wireless communication includes means for receiving, from a user equipment over an uplink channel, an uplink message indicating an uplink resource bandwidth capability of a PUCCH of the UE based on a power spectral density limitation of the UE. The apparatus 1502/1502' also includes means for transmitting, to the UE over a downlink channel, a downlink message indicating an uplink resource allocation that corresponds to the uplink resource bandwidth capability. In another configuration, the apparatus 1502/1502' for wireless communication includes means for transmitting, to a user equipment (UE) over a downlink channel, a RRC message comprising a downlink configuration that indicates a first set of uplink resources and a second set of uplink resources of a PUCCH. The apparatus 1502/1502' also includes means for receiving, from the UE over an uplink channel, an acknowledgment message in response to a downlink message of a RACH process. In some aspects, the acknowledgment message may indicate an uplink resource bandwidth capability of the PUCCH of the UE and may further indicate a selection between the first set of uplink resources and the second set of uplink resources based on a power spectral density limitation of the UE. The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following clauses are illustrative only and may be combined with aspects of other implementations or teachings described herein, without limitation.

Aspect 1 is a method of wireless communication at a user equipment that includes transmitting, to a base station (BS) over an uplink channel, an uplink message indicating an uplink resource bandwidth capability of a physical uplink control channel (PUCCH) of the UE based at least in part on a power spectral density (PSD) limitation and a maximum transmission power of the UE; and receiving, from the BS over a downlink channel, a downlink message indicating an uplink resource allocation of the PUCCH that corresponds to the uplink resource bandwidth capability.

In Aspect 2, the method of Aspect 1 further includes that the uplink resource bandwidth capability indicates whether the UE operates with a first uplink resource bandwidth or a second uplink resource bandwidth different than the first uplink resource bandwidth.

In Aspect 3, the method of Aspect 1 or Aspect 2 further includes that the uplink message includes a media access control (MAC) protocol data unit (PDU), wherein the MAC PDU includes a MAC subheader comprising a logical channel identifier (LCID) field.

In Aspect 4, the method of Aspect 3 further includes that the uplink message comprises a flag indicating the uplink resource bandwidth capability based on a selection between the first uplink resource bandwidth and the second uplink resource bandwidth, wherein the flag is included in at least a portion of the LCID field.

In Aspect 5, the method of Aspect 3 further includes that the MAC PDU includes a MAC control element (MAC CE), wherein the uplink resource bandwidth capability is included in at least a portion of the MAC CE.

In Aspect 6, the method of Aspect 3 further includes that the uplink resource bandwidth capability indicates a maximum number of resource blocks for a physical uplink control channel based on the PSD limitation and a maximum transmit power of the UE, wherein the uplink resource bandwidth capability is included in a content portion of the MAC PDU.

In Aspect 7, the method of any one of Aspects 1-6 further includes that the uplink message indicates the uplink resource bandwidth capability with a different demodulation reference signal (DMRS) scrambling sequence for each of the first uplink resource bandwidth and the second uplink resource bandwidth.

In Aspect 8, the method of any one of Aspects 1-7 further includes that the uplink message indicates the uplink resource bandwidth capability with a different physical uplink shared channel (PUSCH) payload scrambling sequence for each of the first uplink resource bandwidth and the second uplink resource bandwidth.

In Aspect 9, the method of any one of Aspects 1-8 further includes transmitting, to the BS over a random access channel, a random access preamble; and receiving, from the BS over a downlink channel, a random access response based on the random access preamble.

In Aspect 10, the method of Aspect 9 further includes receiving, from the BS over a downlink channel, a radio resource control (RRC) message comprising a downlink configuration that indicates a selected set of uplink resources for the resource allocation of the PUCCH; obtaining one or more measurements of the random access response; determining a carrier-to-interference-plus-noise ratio (CINR)

based on the one or more measurements of the random access response and a transmit power of the random access preamble; determining a downlink pathloss measurement of the random access response from the one or more measurements of the random access response; and selecting a specified number of resource blocks that corresponds to the CINR from the selected set of uplink resources based on the downlink pathloss measurement and the PSD limitation of the UE, wherein the uplink resource bandwidth capability indicates the specified number of resource blocks for a physical uplink control channel.

In Aspect 11, the method of Aspect 9 further includes that the random access preamble corresponds to a random access channel (RACH) message 1 of a four-step RACH process, the random access response corresponds to a RACH message 2 of the four-step RACH process, the uplink message corresponds to a RACH message 3 of the four-step RACH process, and the downlink message corresponds to a RACH message 4 of the four-step RACH process.

In Aspect 12, the method of Aspect 9 further includes that the uplink message corresponds to at least a portion of a RACH message A of a two-step RACH process, and the downlink message corresponds to at least a portion of a RACH message B of the two-step RACH process.

In Aspect 13, the method of Aspect 12 further includes that the RACH message A comprises a physical random access channel (PRACH) and a physical uplink shared channel (PUSCH), wherein the PRACH includes the random access preamble and the PUSCH includes the uplink message, and wherein the uplink resource bandwidth capability is included in the PUSCH of the RACH message A.

In Aspect 14, the method of any one of Aspects 1-13 further includes receiving, from the BS over the downlink channel, a radio resource control (RRC) message comprising a downlink configuration that indicates a specified number of resource blocks allocated for the PUCCH.

In Aspect 15, the method of any one of Aspects 1-14 further includes that the uplink resource allocation in the downlink message comprises a physical uplink control channel (PUCCH) resource indicator (PRI) that indicates a selection between a first set of uplink resources and a second set of uplink resources different than the first set of uplink resources.

In Aspect 16, the method of Aspect 15 further includes that the first set of uplink resources and the second set of uplink resources are included in one or more entries of an uplink resource table that is hardcoded in the UE.

In Aspect 17, the method of Aspect 15 further includes receiving, from the BS, a downlink configuration indicating the first set of uplink resources and the second set of uplink resources.

In Aspect 18, the method of any one of Aspects 1-17 further includes transmitting, to the BS over a random access channel, a random access preamble with a specified preamble length that indicates the uplink resource bandwidth capability of the PUCCH of the UE, and wherein the uplink resource bandwidth capability indicates that the UE operates with a first uplink resource bandwidth when the random access preamble is of a first preamble length, wherein the uplink resource bandwidth capability indicates that the UE operates with a second uplink resource bandwidth different than the first uplink resource bandwidth when the random access preamble is of a second preamble length different than the first preamble length.

Aspect 19 is a device including one or more processors and one or more memories in electronic communication with the one or more processors storing instructions executable by the one or more processors to cause the system or apparatus to implement a method as in any of Aspects 1 to 18.

Aspect 20 is a system or apparatus including means for implementing a method or realizing an apparatus as in any of Aspects 1 to 18.

Aspect 21 is a non-transitory computer readable medium storing instructions executable by one or more processors to cause the one or more processors to implement a method as in any of Aspects 1 to 18.

Aspect 22 is a method of wireless communication at a user equipment that includes receiving, from a base station (BS) over a downlink channel, a radio resource control (RRC) message comprising a downlink configuration that indicates a first set of uplink resources and a second set of uplink resources; and transmitting, to the BS over an uplink channel, an acknowledgment message in response to a downlink message of a random access channel (RACH) process, the acknowledgment message indicating an uplink resource bandwidth capability of a physical uplink control channel (PUCCH) of the UE and further indicating a selection between the first set of uplink resources and the second set of uplink resources based on a power spectral density limitation and a maximum transmission power of the UE.

In Aspect 23, the method of Aspect 22 further includes that the transmitting the acknowledgment message comprises transmitting, to the BS on a first set of uplink resources or a second set of uplink resources, the acknowledgment message based on a comparison between an intended transmit power of the acknowledgment message and a reference transmit power threshold.

In Aspect 24, the method of Aspect 22 or Aspect 23 further includes determining whether the intended transmit power of the acknowledgment message exceeds the reference transmit power threshold based on the comparison; selecting the first set of uplink resources when the intended transmit power does not exceed the reference transmit power threshold; and selecting the second set of uplink resources when the intended transmit power exceeds the reference transmit power threshold.

In Aspect 25, the method of any one of Aspects 22-24 further includes that the transmitting the acknowledgment message comprises transmitting, to the BS over the uplink channel on the first set of uplink resources, the acknowledgment message based on the comparison indicating that the intended transmit power is lesser than the reference transmit power threshold.

In Aspect 26, the method of any one of Aspects 22-25 further includes that the transmitting the acknowledgment message comprises transmitting, to the BS over the uplink channel on the second set of uplink resources, the acknowledgment message based on the comparison indicating that the intended transmit power is greater than the reference transmit power threshold.

In Aspect 27, the method of any one of Aspects 22-26 further includes that the first set of uplink resources comprises a first number of uplink resources and the second set of uplink resources comprises a second number of uplink resources greater than the first number of uplink resources.

In Aspect 28, the method of Aspect 27 further includes that the first number of uplink resources corresponds to a single resource block allocated for the PUCCH, and the transmitting, on the first set of uplink resources, the acknowledgment message comprises transmitting, to the BS on the PUCCH within the single resource block, the acknowledgment message.

In Aspect 29, the method of Aspect 27 further includes that the second set of uplink resources corresponds to a plurality of contiguous resource blocks allocated for the PUCCH, and the transmitting, on the second set of uplink resources, the acknowledgment message comprises transmitting, to the BS on the PUCCH, the acknowledgment message spanning across the plurality of contiguous resource blocks.

In Aspect 30, the method of any one of Aspects 22-29 further includes transmitting, to the BS over a random access channel, a random access preamble of the RACH process; receiving, from the BS over a downlink channel, a random access response of the RACH process based on the random access preamble; transmitting, to the BS over an uplink channel, an uplink message of the RACH process based on the random access response; and receiving, from the BS over a downlink channel, the downlink message of the RACH process, wherein the random access preamble corresponds to a RACH message 1 of a four-step RACH process, the random access response corresponds to a RACH message 2 of the four-step RACH process, the uplink message corresponds to a RACH message 3 of the four-step RACH process, and the downlink message corresponds to a RACH message 4 of the four-step RACH process.

Aspect 31 is a device including one or more processors and one or more memories in electronic communication with the one or more processors storing instructions executable by the one or more processors to cause the system or apparatus to implement a method as in any of Aspects 22 to 30.

Aspect 32 is a system or apparatus including means for implementing a method or realizing an apparatus as in any of Aspects 22 to 30.

Aspect 33 is a non-transitory computer readable medium storing instructions executable by one or more processors to cause the one or more processors to implement a method as in any of Aspects 22 to 30.

Aspect 34 is a method of wireless communication at a base station that includes receiving, from a user equipment (UE) over an uplink channel, an uplink message indicating an uplink resource bandwidth capability of a physical uplink control channel (PUCCH) of the UE based on a power spectral density (PSD) limitation of the UE; and transmitting, to the UE over a downlink channel, a downlink message indicating an uplink resource allocation of the PUCCH that corresponds to the uplink resource bandwidth capability.

In Aspect 35, the method of Aspect 34 further includes transmitting, to the UE over the downlink channel, a radio resource control (RRC) message comprising a downlink configuration that indicates a specified number of resource blocks allocated for the PUCCH.

In Aspect 36, the method of Aspect 34 further includes transmitting, to the UE, a downlink configuration indicating a first set of uplink resources and a second set of uplink resources different than the first set of uplink resources, wherein the uplink resource allocation in the downlink message comprises a physical uplink control channel (PUCCH) resource indicator (PRI) that indicates a selection between the first set of uplink resources and the second set of uplink resources.

In Aspect 37, the method of any of Aspects 34-36 further includes receiving, from the UE over a random access channel, a random access preamble with a specified preamble length that indicates the uplink resource bandwidth capability of the PUCCH of the UE, and wherein the uplink resource bandwidth capability indicates that the UE operates with a first uplink resource bandwidth when the random access preamble is of a first preamble length, wherein the uplink resource bandwidth capability indicates that the UE operates with a second uplink resource bandwidth different than the first uplink resource bandwidth when the random access preamble is of a second preamble length different than the first preamble length.

Aspect 38 is a device including one or more processors and one or more memories in electronic communication with the one or more processors storing instructions executable by the one or more processors to cause the system or apparatus to implement a method as in any of Aspects 34 to 37.

Aspect 39 is a system or apparatus including means for implementing a method or realizing an apparatus as in any of Aspects 34 to 37.

Aspect 40 is a non-transitory computer readable medium storing instructions executable by one or more processors to cause the one or more processors to implement a method as in any of Aspects 34 to 37.

Aspect 41 is a method of wireless communication at a base station that includes transmitting, to a user equipment (UE) over a downlink channel, a radio resource control (RRC) message comprising a downlink configuration that indicates a first set of uplink resources and a second set of uplink resources; and receiving, from the UE over an uplink channel, an acknowledgment message in response to a downlink message of a random access channel (RACH) process, the acknowledgment message indicating an uplink resource bandwidth capability of a physical uplink control channel (PUCCH) of the UE and further indicating a selection between the first set of uplink resources and the second set of uplink resources based on a power spectral density limitation and a maximum transmission power of the UE.

In Aspect 42, the method of Aspect 41 further includes that the receiving the acknowledgment message comprises receiving, from the UE on a first set of uplink resources or a second set of uplink resources, the acknowledgment message.

In Aspect 43, the method of Aspect 41 or Aspect 42 further includes receiving, from the UE over a random access channel, a random access preamble of the RACH process; transmitting, to the UE over a downlink channel, a random access response of the RACH process based on the random access preamble; receiving, from the UE over an uplink channel, an uplink message of the RACH process based on the random access response; and transmitting, to the UE over a downlink channel, the downlink message of the RACH process, wherein the random access preamble corresponds to a RACH message 1 of a four-step RACH process, the random access response corresponds to a RACH message 2 of the four-step RACH process, the uplink message corresponds to a RACH message 3 of the four-step RACH process, and the downlink message corresponds to a RACH message 4 of the four-step RACH process.

Aspect 44 is a device including one or more processors and one or more memories in electronic communication with the one or more processors storing instructions executable by the one or more processors to cause the system or apparatus to implement a method as in any of Aspects 41 to 43.

Aspect 45 is a system or apparatus including means for implementing a method or realizing an apparatus as in any of Aspects 41 to 43.

Aspect 46 is a non-transitory computer readable medium storing instructions executable by one or more processors to cause the one or more processors to implement a method as in any of Aspects 41 to 43.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more.". Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration.". Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means.". As such, no claim element is to be construed as a means plus function unless the element is expressly recited using the phrase "means for."

What is claimed is:

1. A method of wireless communication at a user equipment (UE), the method comprising:
transmitting, to a base station (BS) over an uplink channel, an uplink message indicating an uplink resource bandwidth capability of a physical uplink control channel (PUCCH) of the UE based at least in part on a power spectral density (PSD) limitation and a maximum transmission power of the UE; and
receiving, from the BS over a downlink channel, a downlink message indicating an uplink resource allocation of the PUCCH that corresponds to the uplink resource bandwidth capability.

2. The method of claim 1, wherein the uplink resource bandwidth capability indicates whether the UE operates the PUCCH with a first uplink resource bandwidth or a second uplink resource bandwidth different than the first uplink resource bandwidth.

3. The method of claim 2, wherein the uplink message includes a media access control (MAC) protocol data unit (PDU), wherein the MAC PDU includes a MAC subheader comprising a logical channel identifier (LCID) field.

4. The method of claim 3, wherein the uplink message comprises a flag indicating the uplink resource bandwidth capability based on a selection between the first uplink resource bandwidth and the second uplink resource bandwidth, wherein the flag is included in at least a portion of the LCID field.

5. The method of claim 3, wherein the MAC PDU includes a MAC control element (MAC CE), wherein the uplink resource bandwidth capability is included in at least a portion of the MAC CE.

6. The method of claim 3, wherein the uplink resource bandwidth capability indicates a maximum number of resource blocks for the PUCCH based on the PSD limitation and the maximum transmission power of the UE, wherein the uplink resource bandwidth capability is included in a content portion of the MAC PDU.

7. The method of claim 2, wherein the uplink message indicates the uplink resource bandwidth capability with a different demodulation reference signal (DMRS) scrambling sequence for each of the first uplink resource bandwidth and the second uplink resource bandwidth.

8. The method of claim 2, wherein the uplink message indicates the uplink resource bandwidth capability with a different physical uplink shared channel (PUSCH) payload scrambling sequence for each of the first uplink resource bandwidth and the second uplink resource bandwidth.

9. The method of claim 1, further comprising:
transmitting, to the BS over a random access channel, a random access preamble; and
receiving, from the BS over the downlink channel, a random access response based on the random access preamble.

10. The method of claim 9, further comprising:
receiving, from the BS over the downlink channel, a radio resource control (RRC) message comprising a downlink configuration that indicates a selected set of uplink resources for the uplink resource allocation of the PUCCH.

11. The method of claim 10, further comprising:
obtaining one or more measurements of the random access response;
determining a carrier-to-interference-plus-noise ratio (CINR) based on the one or more measurements of the random access response and a transmit power of the random access preamble;
determining a downlink pathloss measurement of the random access response from the one or more measurements of the random access response; and
selecting a specified number of resource blocks that corresponds to the CINR from the selected set of uplink resources based on the downlink pathloss measurement and the PSD limitation of the UE, wherein the uplink resource bandwidth capability indicates the specified number of resource blocks for the PUCCH.

12. The method of claim 9, wherein the random access preamble corresponds to a random access channel (RACH) message 1 of a four-step RACH process, the random access response corresponds to a RACH message 2 of the four-step RACH process, the uplink message corresponds to a RACH message 3 of the four-step RACH process, and the downlink message corresponds to a RACH message 4 of the four-step RACH process.

13. The method of claim 9, wherein the uplink message corresponds to at least a portion of a RACH message A of a two-step RACH process, and the downlink message corresponds to at least a portion of a RACH message B of the two-step RACH process.

14. The method of claim 13, wherein the RACH message A comprises a physical random access channel (PRACH) and a physical uplink shared channel (PUSCH), wherein the PRACH includes the random access preamble and the PUSCH includes the uplink message, and wherein the uplink resource bandwidth capability is included in the PUSCH of the RACH message A.

15. The method of claim 1, further comprising:
receiving, from the BS over the downlink channel, a radio resource control (RRC) message comprising a downlink configuration that indicates a specified number of resource blocks allocated for the PUCCH.

16. The method of claim 1, wherein the uplink resource allocation in the downlink message comprises a PUCCH resource indicator (PM) that indicates a selection between a first set of uplink resources and a second set of uplink resources different than the first set of uplink resources.

17. The method of claim 16, wherein the first set of uplink resources and the second set of uplink resources are included in one or more entries of an uplink resource table that is hardcoded in the UE.

18. The method of claim 16, further comprising:
receiving, from the B S, a downlink configuration indicating the first set of uplink resources and the second set of uplink resources.

19. The method of claim 1, further comprising:
transmitting, to the BS over a random access channel, a random access preamble with a specified preamble length that indicates the uplink resource bandwidth capability of the PUCCH of the UE, and
wherein the uplink resource bandwidth capability indicates that the UE operates with a first uplink resource bandwidth when the random access preamble is of a first preamble length,
wherein the uplink resource bandwidth capability indicates that the UE operates with a second uplink resource bandwidth different than the first uplink resource bandwidth when the random access preamble is of a second preamble length different than the first preamble length.

20. An apparatus for wireless communication at a user equipment (UE), the apparatus comprising:
a memory;
a transceiver; and
at least one processor communicatively coupled to the memory and the transceiver, the at least one processor configured to:
transmit, to a base station (BS) over an uplink channel, via the transceiver, an uplink message indicating an uplink resource bandwidth capability of a physical uplink control channel (PUCCH) of the UE based on a power spectral density (PSD) limitation and a maximum transmission power of the UE; and
receive, from the BS over a downlink channel, via the transceiver, a downlink message indicating an uplink resource allocation of the PUCCH that corresponds to the uplink resource bandwidth capability.

21. The apparatus of claim 20, wherein the uplink resource bandwidth capability indicates whether the UE operates the PUCCH with a first uplink resource bandwidth or a second uplink resource bandwidth different than the first uplink resource bandwidth.

22. The apparatus of claim 21, wherein the uplink message includes a media access control (MAC) protocol data unit (PDU), wherein the MAC PDU includes a MAC subheader comprising a logical channel identifier (LCID) field.

23. The apparatus of claim 22, wherein the uplink message comprises a flag indicating the uplink resource bandwidth capability based on a selection between the first uplink resource bandwidth and the second uplink resource bandwidth, wherein the flag is included in at least a portion of the LCID field.

24. The apparatus of claim 22, wherein the MAC PDU includes a MAC control element (MAC CE), wherein the uplink resource bandwidth capability is included in at least a portion of the MAC CE.

25. The apparatus of claim 22, wherein the uplink resource bandwidth capability indicates a maximum number of resource blocks for the PUCCH based on the PSD limitation and the maximum transmission power of the UE, wherein the uplink resource bandwidth capability is included in a content portion of the MAC PDU.

26. The apparatus of claim 21, wherein the uplink message indicates the uplink resource bandwidth capability with a different demodulation reference signal (DMRS) scrambling sequence for each of the first uplink resource bandwidth and the second uplink resource bandwidth.

27. The apparatus of claim 21, wherein the uplink message indicates the uplink resource bandwidth capability with a different physical uplink shared channel (PUSCH) payload scrambling sequence for each of the first uplink resource bandwidth and the second uplink resource bandwidth.

28. The apparatus of claim 20, wherein the at least one processor is further configured to:
transmit, to the BS over a random access channel, via the transceiver, a random access preamble; and
receive, from the BS over the downlink channel, via the transceiver, a random access response based on the random access preamble.

29. The apparatus of claim 28, wherein the at least one processor is further configured to:
receive, from the BS over the downlink channel, via the transceiver, a radio resource control (RRC) message comprising a downlink configuration that indicates a selected set of uplink resources for the uplink resource allocation of the PUCCH.

30. The apparatus of claim 29, wherein the at least one processor is further configured to:
obtain one or more measurements of the random access response;
determine a carrier-to-interference-plus-noise ratio (CINR) based on the one or more measurements of the random access response and a transmit power of the random access preamble;
determine a downlink pathloss measurement of the random access response from the one or more measurements of the random access response; and select a specified number of resource blocks that corresponds to the CINR from the selected set of uplink resources based on the downlink pathloss measurement and the PSD limitation of the UE,
wherein the uplink resource bandwidth capability indicates the specified number of resource blocks for the PUCCH.

31. The apparatus of claim 28, wherein the random access preamble corresponds to a random access channel (RACH) message 1 of a four-step RACH process, the random access response corresponds to a RACH message 2 of the four-step RACH process, the uplink message corresponds to a RACH message 3 of the four-step RACH process, and the downlink message corresponds to a RACH message 4 of the four-step RACH process.

32. The apparatus of claim 28, wherein the uplink message corresponds to at least a portion of a RACH message A of a two-step RACH process, and the downlink message corresponds to at least a portion of a RACH message B of the two-step RACH process, wherein the RACH message A comprises a physical random access channel (PRACH) and a physical uplink shared channel (PUSCH), wherein the PRACH includes the random access preamble and the PUSCH includes the uplink message, and wherein the uplink resource bandwidth capability is included in the PUSCH of the RACH message A.

33. The apparatus of claim 20, wherein the at least one processor is further configured to:
receive, from the BS over the downlink channel, via the transceiver, a radio resource control (RRC) message comprising a downlink configuration that indicates a specified number of resource blocks allocated for the PUCCH.

34. The apparatus of claim 20, wherein the uplink resource allocation in the downlink message comprises a PUCCH resource indicator (PM) that indicates a selection between a first set of uplink resources and a second set of uplink resources different than the first set of uplink resources.

35. The apparatus of claim 34, wherein the first set of uplink resources and the second set of uplink resources are included in one or more entries of an uplink resource table that is hardcoded in the UE.

36. The apparatus of claim 34, wherein the at least one processor is further configured to:
receive, from the BS, via the transceiver, a downlink configuration indicating the first set of uplink resources and the second set of uplink resources.

37. The apparatus of claim 20, wherein the at least one processor is further configured to:
transmit, to the BS over a random access channel, via the transceiver, a random access preamble with a specified preamble length that indicates the uplink resource bandwidth capability of the PUCCH of the UE, and
wherein the uplink resource bandwidth capability indicates that the UE operates with a first uplink resource bandwidth when the random access preamble is of a first preamble length,
wherein the uplink resource bandwidth capability indicates that the UE operates with a second uplink resource bandwidth different than the first uplink resource bandwidth when the random access preamble is of a second preamble length different than the first preamble length.

38. A method of wireless communication at a user equipment (UE), the method comprising:
receiving, from a base station (BS) over a downlink channel, a radio resource control (RRC) message comprising a downlink configuration that indicates a first set of uplink resources and a second set of uplink resources; and
transmitting, to the BS over an uplink channel, an acknowledgment message in response to a downlink message of a random access channel (RACH) process, the acknowledgment message indicating an uplink resource bandwidth capability of a physical uplink control channel (PUCCH) of the UE and further indicating a selection between the first set of uplink resources and the second set of uplink resources based on a power spectral density (PSD) limitation and a maximum transmission power of the UE.

39. The method of claim 38, wherein the transmitting the acknowledgment message comprises transmitting, to the BS on the first set of uplink resources or the second set of uplink resources, the acknowledgment message based on a comparison between an intended transmit power of the acknowledgment message and a reference transmit power threshold.

40. The method of claim 39, further comprising:
determining whether the intended transmit power of the acknowledgment message exceeds the reference transmit power threshold based on the comparison;
selecting the first set of uplink resources when the intended transmit power does not exceed the reference transmit power threshold; and
selecting the second set of uplink resources when the intended transmit power exceeds the reference transmit power threshold.

41. The method of claim 39, wherein the transmitting the acknowledgment message comprises transmitting, to the BS over the uplink channel on the first set of uplink resources, the acknowledgment message based on the comparison indicating that the intended transmit power is less than the reference transmit power threshold.

42. The method of claim 39, wherein the transmitting the acknowledgment message comprises transmitting, to the BS over the uplink channel on the second set of uplink resources, the acknowledgment message based on the comparison indicating that the intended transmit power is greater than the reference transmit power threshold.

43. The method of claim 39, wherein the first set of uplink resources comprises a first number of uplink resources and the second set of uplink resources comprises a second number of uplink resources greater than the first number of uplink resources.

44. The method of claim 43, wherein:
the first number of uplink resources corresponds to a single resource block allocated for the PUCCH, and
the transmitting, on the first set of uplink resources, the acknowledgment message comprises transmitting, to the BS on the PUCCH within the single resource block, the acknowledgment message.

45. The method of claim 43, wherein:
the second set of uplink resources corresponds to a plurality of contiguous resource blocks allocated for the PUCCH, and
the transmitting, on the second set of uplink resources, the acknowledgment message comprises transmitting, to the BS on the PUCCH, the acknowledgment message spanning across the plurality of contiguous resource blocks.

46. The method of claim 38, further comprising:
transmitting, to the BS over a random access channel, a random access preamble of the RACH process;

receiving, from the BS over the downlink channel, a random access response of the RACH process based on the random access preamble;

transmitting, to the BS over the uplink channel, an uplink message of the RACH process based on the random access response; and receiving, from the BS over the downlink channel, the downlink message of the RACH process, wherein the random access preamble corresponds to a RACH message 1 of a four-step RACH process, the random access response corresponds to a RACH message 2 of the four-step RACH process, the uplink message corresponds to a RACH message 3 of the four-step RACH process, and the downlink message corresponds to a RACH message 4 of the four-step RACH process.

47. An apparatus for wireless communication at a user equipment (UE), the apparatus comprising:
a memory;
a transceiver; and
at least one processor communicatively coupled to the memory and the transceiver, the at least one processor configured to:
receive, from a base station (BS) over a downlink channel, via the transceiver, a radio resource control (RRC) message comprising a downlink configuration that indicates a first set of uplink resources and a second set of uplink resources; and
transmit, to the BS over an uplink channel, via the transceiver, an acknowledgment message in response to a downlink message of a random access channel (RACH) process, the acknowledgment message indicating an uplink resource bandwidth capability of a physical uplink control channel (PUCCH) of the UE and further indicating a selection between the first set of uplink resources and the second set of uplink resources based on a power spectral density (PSD) limitation and a maximum transmission power of the UE.

48. The apparatus of claim 47, wherein the at least one processor is configured to transmit the acknowledgment message by transmitting, to the BS on the first set of uplink resources or the second set of uplink resources, via the transceiver, the acknowledgment message based on a comparison between an intended transmit power of the acknowledgment message and a reference transmit power threshold.

49. The apparatus of claim 48, wherein the at least one processor is further configured to:
determine whether the intended transmit power of the acknowledgment message exceeds the reference transmit power threshold based on the comparison;
select the first set of uplink resources when the intended transmit power does not exceed the reference transmit power threshold; and
select the second set of uplink resources when the intended transmit power exceeds the reference transmit power threshold.

50. The apparatus of claim 48, wherein the at least one processor configured to transmit the acknowledgment message by transmitting, to the BS over the uplink channel on the first set of uplink resources, via the transceiver, the acknowledgment message based on the comparison indicating that the intended transmit power is less than the reference transmit power threshold.

51. The apparatus of claim 48, wherein the at least one processor configured to transmit the acknowledgment message by transmitting, to the BS over the uplink channel on the second set of uplink resources, via the transceiver, the acknowledgment message based on the comparison indicating that the intended transmit power is greater than the reference transmit power threshold.

52. A method of wireless communication at a base station (BS), the method comprising:
receiving, from a user equipment (UE) over an uplink channel, an uplink message indicating an uplink resource bandwidth capability of a physical uplink control channel (PUCCH) of the UE based on a power spectral density (PSD) limitation and a maximum transmission power of the UE; and
transmitting, to the UE over a downlink channel, a downlink message indicating an uplink resource allocation of the PUCCH that corresponds to the uplink resource bandwidth capability.

53. The method of claim 52, further comprising:
transmitting, to the UE over the downlink channel, a radio resource control (RRC) message comprising a downlink configuration that indicates a specified number of resource blocks allocated for the PUCCH.

54. The method of claim 52, further comprising:
transmitting, to the UE, a downlink configuration indicating a first set of uplink resources and a second set of uplink resources different than the first set of uplink resources,
wherein the uplink resource allocation in the downlink message comprises PUCCH resource indicator (PRI) that indicates a selection between the first set of uplink resources and the second set of uplink resources.

55. The method of claim 52, further comprising:
receiving, from the UE over a random access channel, a random access preamble with a specified preamble length that indicates the uplink resource bandwidth capability of the PUCCH of the UE, and
wherein the uplink resource bandwidth capability indicates that the UE operates with a first uplink resource bandwidth when the random access preamble is of a first preamble length,
wherein the uplink resource bandwidth capability indicates that the UE operates with a second uplink resource bandwidth different than the first uplink resource bandwidth when the random access preamble is of a second preamble length different than the first preamble length.

56. An apparatus for wireless communication at a base station (BS), the apparatus comprising:
a memory;
a transceiver; and
at least one processor communicatively coupled to the memory and the transceiver, the at least one processor configured to:
receive, from a user equipment (UE) over an uplink channel, via the transceiver, an uplink message indicating an uplink resource bandwidth capability of a physical uplink control channel (PUCCH) of the UE based on a power spectral density (PSD) limitation and a maximum transmission power of the UE; and
transmit, to the UE over a downlink channel, via the transceiver, a downlink message indicating an uplink resource allocation that corresponds to the uplink resource bandwidth capability.

57. A method of wireless communication at a base station, the method comprising:
transmitting, to a user equipment (UE) over a downlink channel, a radio resource control (RRC) message comprising a downlink configuration that indicates a first set of uplink resources and a second set of uplink resources; and receiving, from the UE over an uplink channel, an acknowledgment message in response to a downlink message of a random access channel (RACH) process, the acknowledgment message indicating an uplink resource bandwidth capability of a physical uplink control channel (PUCCH) of the UE and further indicating a selection between the first set of uplink resources and the second set of uplink resources based on a power spectral density limitation and a maximum transmission power of the UE.

58. The method of claim 57, wherein the receiving the acknowledgment message comprises receiving, from the UE on the first set of uplink resources or the second set of uplink resources, the acknowledgment message.

59. The method of claim 57, further comprising:
receiving, from the UE over a random access channel, a random access preamble of the RACH process;
transmitting, to the UE over the downlink channel, a random access response of the RACH process based on the random access preamble;
receiving, from the UE over the uplink channel, an uplink message of the RACH process based on the random access response; and
transmitting, to the UE over the downlink channel, the downlink message of the RACH process,
wherein the random access preamble corresponds to a RACH message 1 of a four-step RACH process, the random access response corresponds to a RACH message 2 of the four-step RACH process, the uplink message corresponds to a RACH message 3 of the four-step RACH process, and the downlink message corresponds to a RACH message 4 of the four-step RACH process.

60. An apparatus for wireless communication at a base station, the apparatus comprising:
a memory;
a transceiver; and
at least one processor communicatively coupled to the memory and the transceiver, the at least one processor configured to:
transmit, to a user equipment (UE) over a downlink channel, via the transceiver, a radio resource control (RRC) message comprising a downlink configuration that indicates a first set of uplink resources and a second set of uplink resources; and
receive, from the UE over an uplink channel, via the transceiver, an acknowledgment message in response to a downlink message of a random access channel (RACH) process, the acknowledgment message indicating an uplink resource bandwidth capability of a physical uplink control channel (PUCCH) of the UE and further indicating a selection between the first set of uplink resources and the second set of uplink resources based on a power spectral density limitation and a maximum transmission power of the UE.

* * * * *